US011859359B2

(12) United States Patent
Aughton

(10) Patent No.: US 11,859,359 B2
(45) Date of Patent: Jan. 2, 2024

(54) ACTUATION AND VALVE MECHANISM

(71) Applicant: Rubicon Research Pty Ltd., Hawthorn East (AU)

(72) Inventor: David John Aughton, Hawthorn East (AU)

(73) Assignee: Rubicon Research Pty Ltd., Hawthorn East (AU)

( * ) Notice: Subject to any disclaimer, the term of this patent is extended or adjusted under 35 U.S.C. 154(b) by 0 days.

(21) Appl. No.: 17/403,217

(22) Filed: Aug. 16, 2021

(65) Prior Publication Data

US 2021/0372069 A1 Dec. 2, 2021

Related U.S. Application Data

(60) Division of application No. 16/389,569, filed on Apr. 19, 2019, now Pat. No. 11,155,974, which is a
(Continued)

(30) Foreign Application Priority Data

Apr. 1, 2011 (AU) ............................ 2011901214

(51) Int. Cl.
*E02B 13/02* (2006.01)
*F16L 55/10* (2006.01)
*F16K 31/50* (2006.01)

(52) U.S. Cl.
CPC ............ *E02B 13/02* (2013.01); *F16K 31/502* (2013.01); *F16K 31/506* (2013.01); *F16L 55/1018* (2013.01)

(58) Field of Classification Search
CPC ............... E02B 13/02; F16L 55/1018; F16H 2019/0668; F16H 19/06; F16H 19/0622;
(Continued)

(56) References Cited

U.S. PATENT DOCUMENTS 229,136 A 6/1880 Jennings
1,460,359 A * 6/1923 Maclear .................. E04F 10/02
74/528
(Continued)

FOREIGN PATENT DOCUMENTS

FR 2583130 A1 12/1986
WO 2002016698 A1 2/2002
(Continued)

OTHER PUBLICATIONS

International Application No. PCT/AU2012/000328, International Preliminary Report on Patentability dated Jul. 25, 2013.
(Continued)

*Primary Examiner* — Michael R Reid
(74) *Attorney, Agent, or Firm* — David D. Brush; Westman, Champlin & Koehler, P.A.

(57) ABSTRACT

An arrangement for controlling and measuring flow. The arrangement includes a fluid control barrier and a flow-measuring apparatus upstream of the fluid control barrier. The fluid control barrier includes a pair of plates for opening and closing a pipe, and the plates are movable towards a center line of the pipe to open the pipe and produce a symmetrical flow profile for the flow-measuring apparatus.

14 Claims, 27 Drawing Sheets

Related U.S. Application Data division of application No. 15/630,268, filed on Jun. 22, 2017, now Pat. No. 10,337,642, which is a continuation of application No. 14/009,331, filed as application No. PCT/AU2012/000328 on Mar. 30, 2012, now abandoned.

(58) Field of Classification Search
CPC ...... F16H 21/50; F16K 1/2007; F16K 31/465; Y10T 74/20486
See application file for complete search history.

(56) References Cited

U.S. PATENT DOCUMENTS

| | | | |
|---|---|---|---|
| 1,659,880 | A | 2/1928 | Kauffman |
| 2,837,991 | A | 6/1958 | De Roo |
| 3,108,481 | A * | 10/1963 | Westmont ............. F16H 9/18 |
| | | | 474/171 |
| 3,153,330 | A | 10/1964 | Melin |
| 3,559,679 | A | 2/1971 | Smirra et al. |
| 3,592,240 | A | 7/1971 | Hedrick et al. |
| 3,918,264 | A | 11/1975 | Bradshaw |
| 3,998,426 | A | 12/1976 | Isbester |
| 4,073,147 | A | 2/1978 | Nomura |
| 4,726,709 | A | 2/1988 | Labelle |
| 5,076,316 | A | 12/1991 | Brown |
| 5,516,230 | A | 5/1996 | Bargeron et al. |
| 5,518,446 | A | 5/1996 | Jacob |
| 6,447,393 | B1 | 9/2002 | McCabe |
| 6,830,312 | B2 * | 12/2004 | Muramatsu ............ F16H 19/06 |
| | | | 355/55 |
| 6,969,044 | B2 | 11/2005 | Delzer et al. |
| 6,988,425 | B2 * | 1/2006 | Nagai .................... F16H 7/023 |
| | | | 74/89.32 |
| 7,077,383 | B1 | 7/2006 | Dreisilker et al. |
| 2002/0175307 | A1 | 11/2002 | McCabe et al. |
| 2002/0195140 | A1 | 12/2002 | Heil |
| 2011/0088483 | A1 | 4/2011 | Will et al. |

FOREIGN PATENT DOCUMENTS

| | | | | |
|---|---|---|---|---|
| WO | | 2010092497 A1 | 8/2010 | |
| WO | WO-2010088731 A1 * | | 8/2010 | ............... E02B 7/28 |

OTHER PUBLICATIONS

International Application No. PCT/AU2012/000328, International Search Report and Written Opinion dated Jun. 12, 2012.
Office Action dated Sep. 18, 2020 for U.S. Appl. No. 16/389,569, filed Apr. 19, 2019.
Final Office Action dated Jan. 11, 2021 for U.S. Appl. No. 16/389,569, filed Apr. 19, 2019.
Advisory Action dated Jun. 4, 2021 for U.S. Appl. No. 16/389,569, filed Apr. 19, 2019.
Notice of Allowance dated Jun. 23, 2021 for U.S. Appl. No. 16/389,569, filed Apr. 19, 2019.
Notice of Allowance dated Feb. 12, 2019 for U.S. Appl. No. 15/630,268, filed Jun. 22, 2017.

* cited by examiner

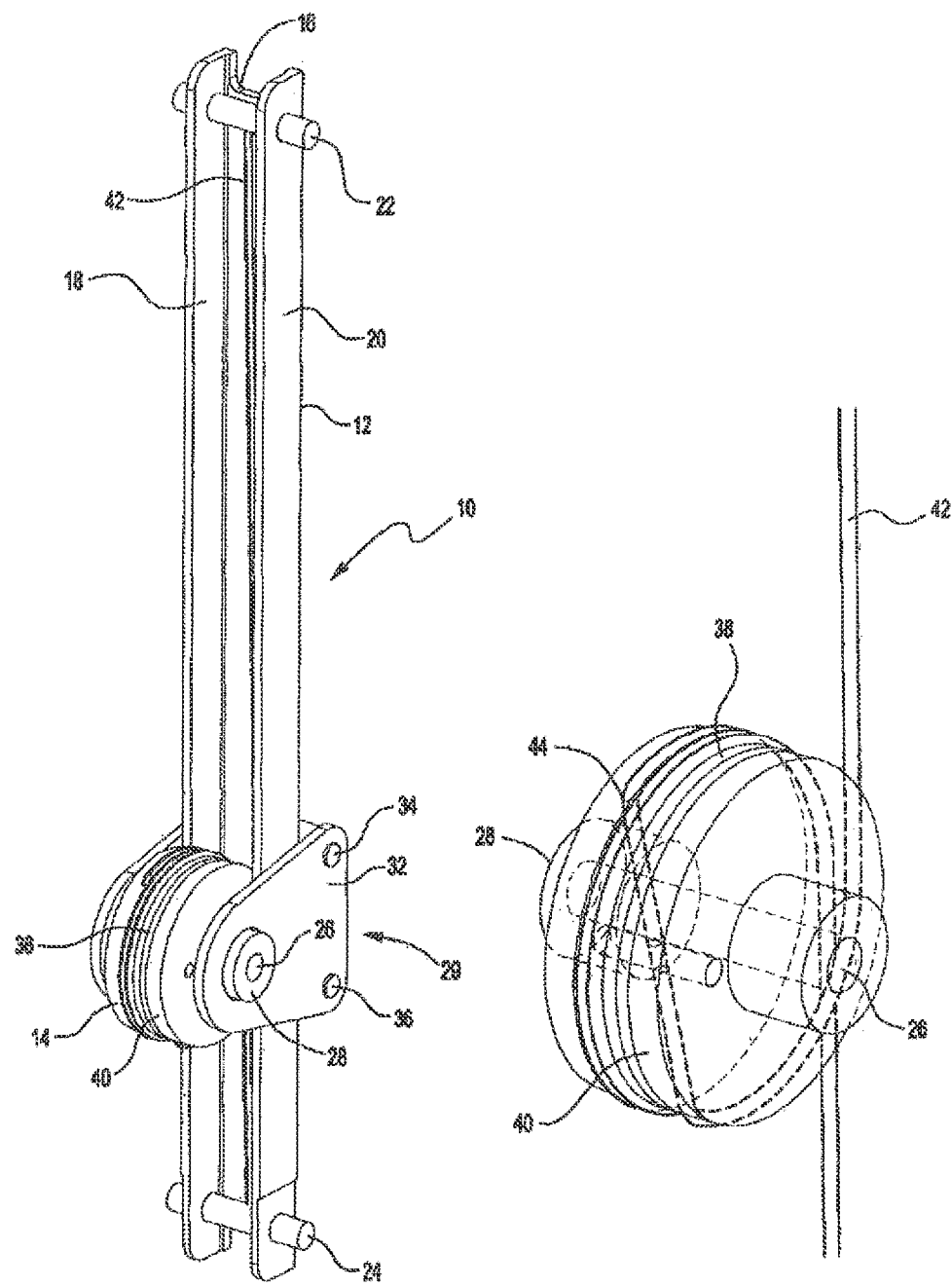

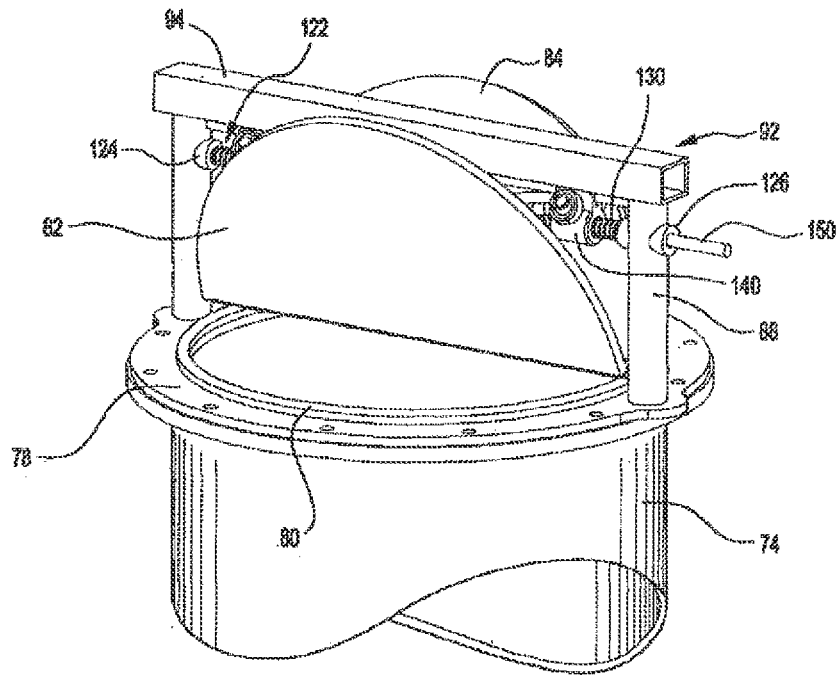
FIG. 40
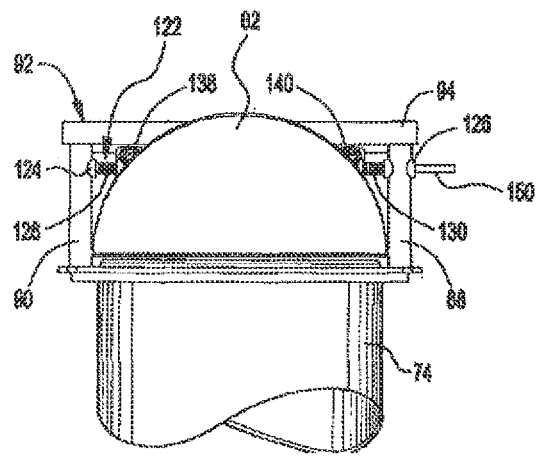 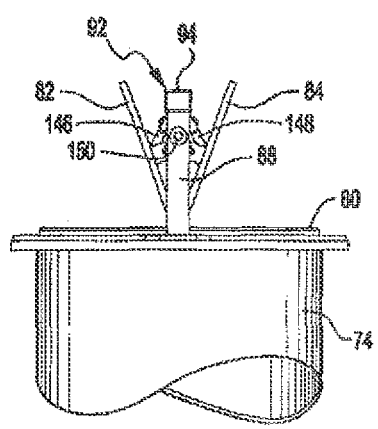
FIG. 41          FIG. 42

ACTUATION AND VALVE MECHANISM

CROSS-REFERENCE TO RELATED APPLICATIONS

This application is a division of U.S. patent application Ser. No. 16/389,569, filed Apr. 19, 2019, which is division of U.S. patent application Ser. No. 15/630,268, filed Jun. 22, 2017, which is a continuation of U.S. patent application Ser. No. 14/009,331, filed Nov. 8, 2013 and entitled "Actuation and Valve Mechanism," which is a national stage application pursuant to 35 U.S.C. § 371 of International Application No. PCT/AU2012/000328, filed Mar. 30, 2012, which claims priority to Australian Patent Application No. 2011901214, filed Apr. 1, 2011, which are hereby incorporated by reference herein in their entireties.

BACKGROUND OF THE INVENTION

The present invention relates to fluid control barriers and actuation mechanisms, which can be incorporated into such barriers, but not limited to irrigation environments.

SUMMARY OF THE INVENTION

The present invention in one embodiment provides a fluid control barrier adapted to be fitted to an end of a pipe or inside said pipe through which fluid is contained or inside a pipe through which fluid flows, a bi-foldable barrier member controls movement of said fluid, said bi-foldable barrier member having a pair of plates with a hinge along their straight edges to allow for opening and closing of said fluid control barrier, at least one pair of struts pivotally mounted to said plates at one end and pivotally attached to a fixed position shaft or cross member at the other end thereof, said struts mounted to said plates along or near to the centroidal axes of said plates to minimize the force required to open or close said bi-foldable barrier member.

Preferably an actuation member is attached to said hinge to provide a push and pull movement of said hinge to allow said bi-foldable barrier member to be opened and closed.

The invention also provides in a further embodiment a cable drive device including a linear drive member, a cable drum attached to a support bracket adapted to be affixed to a surface, said cable drum having an axle supported by said support bracket to allow rotation of said cable drum, said cable drum having a cable affixed at either end of said linear drive member and tautly wrapped around said cable drum, said cable drum located between said ends of said linear drive member to, in use, allow said linear drive member to be guided through said bracket to move said linear drive member longitudinally when said axle is rotated.

In yet a further embodiment there is provided a cable drive device including an arcuate segment drive member, a cable drum having an axle to allow rotation of said cable drum, said cable drum having a cable affixed at either end of the arcuate section of said arcuate segment drive member and tautly wrapped around said cable drum, said cable drum located between said ends of said arcuate section of said arcuate segment drive member to, in use, allow said arcuate segment drive member to be moved when said axle is rotated.

A further embodiment provides a control gate adapted to be installed across a flow channel for liquids, said control gate having a barrier member that is pivotally mounted at or adjacent the base of said flow channel and at least one drive means to raise and lower said barrier member, said at least one drive means comprising a cable drive device as disclosed herein, wherein one of said ends of said linear drive member is pivotally attached to said barrier member.

The invention may also provide a fluid control barrier adapted to be fitted to an end of a pipe through which fluid is contained, a frame member is mounted on said end of said pipe, a barrier member is pivotally mounted one a first edge to said frame member to allow for opening and closing of said fluid control barrier and at least one cable drive device as disclosed herein is fixed to said frame member and said barrier member to allow said barrier member to be opened and closed.

Another embodiment provides a fluid control barrier adapted to be fitted to an end of a pipe through which fluid is contained, a frame member is mounted on said end of said pipe, a bi-foldable barrier member closes said end of said pipe, said bi-foldable barrier member having a pair of plates with a hinge along their straight edges to allow for opening and closing of said fluid control barrier, said hinge pinned to said frame member or said pipe and a pair of lifting means attached to each of said plates to allow said bi-foldable barrier member to be opened and closed.

In a practical embodiment there is provided a fluid control barrier adapted to be fitted inside a pipe through which a fluid flows, a bi-foldable barrier member is provided to control fluid flow through said pipe, said bi-foldable barrier member having a pair of plates with a hinge along their straight edges to allow for opening and closing of said fluid control barrier, said hinge pinned to said pipe and a pair of lifting means attached to each of said plates to allow said bi-foldable barrier member to be opened and closed.

BRIEF DESCRIPTION OF THE DRAWINGS

The structure and functional features of preferred embodiments of the present invention will become more apparent from the following detailed description when taken in conjunction with the accompanying drawings, in which:

FIG. 1 is a perspective view of a first embodiment of a cable drive device made in accordance with the invention;

FIG. 2 is an enlarged perspective view of the cable drum of FIG. 1 showing the position of the cable co-operating with the cable drum;

FIG. 40 is a similar view to that of FIG. 37 with the fluid control barrier shown in the open position;

FIG. 41 is a front view of FIG. 40;

FIG. 42 is a side view of FIG. 40;

DESCRIPTION OF THE EMBODIMENTS

Figure 3:
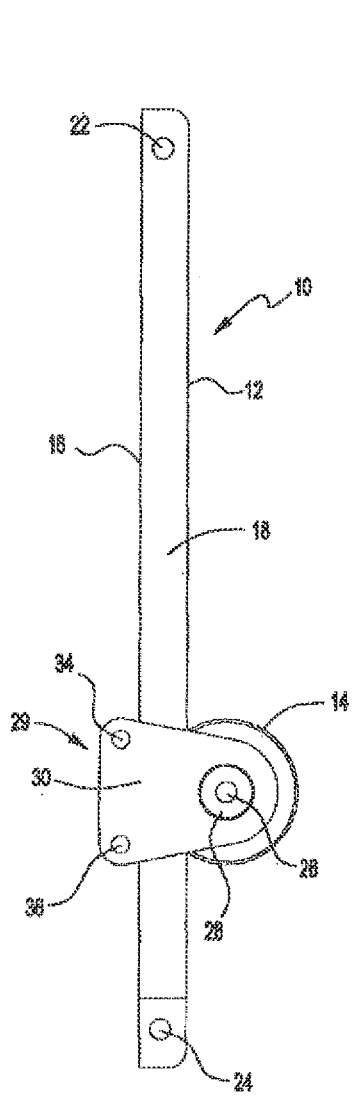
FIG. 3 is a side view of the cable drive device shown in FIG. 1.
Figure 4:
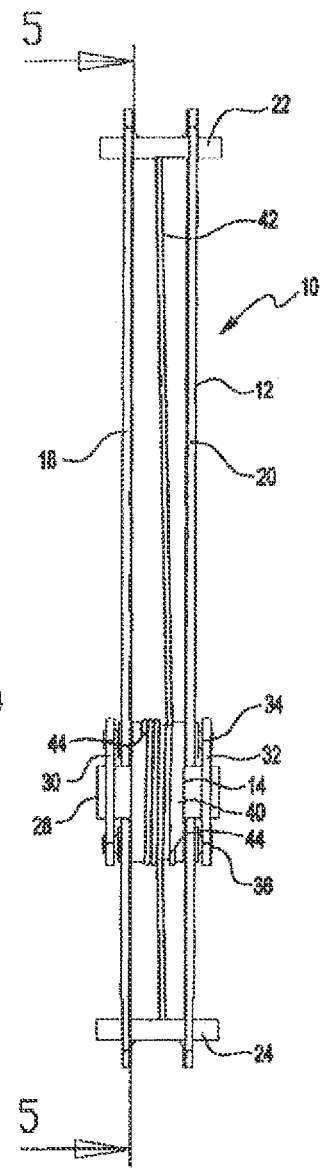
FIG. 4 is a front view of the cable drive device shown in FIG. 1.
Figure 5:
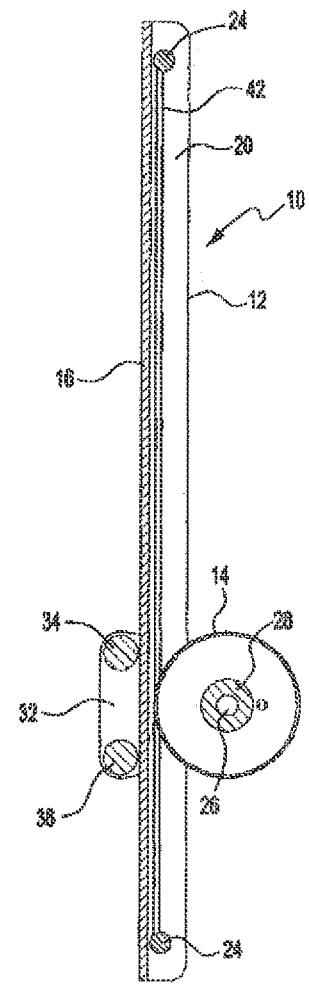
FIG. 5 is a cross-sectional view along and in the direction of arrows 5-5 shown in FIG. 4.

In order to avoid duplication of description, identical reference numerals will be shown, where applicable, throughout the illustrated embodiments to indicate similar integers.

In the drawings a first embodiment is shown in FIGS. 1 to 5, which shows a cable drive device 10 having a linear drive member 12 and cable drum 14. Linear drive member 12 has a longitudinal base member 16 with a pair of arms 18, 20. A pair of pivot pins 22, 24 are provided at each end for attachment to a respective member as described in subsequent embodiments. Cable drum 14 has a central axle 26 rotatably held by a journal or bearings 28 in a support member 29. Arms 18, 20 may, if required, be substituted by a longitudinal bar or plate.

A pair of faceplates 30, 32 support journal or bearings 28 at the opposite end thereof by pins 34, 36. Pins 34, 36 will, in use, slide along base member 16 with the cable drum 14 being on one side of the linear drive member 12 and pins 34, 36 on the other side. Pins 34, 36 will prevent cable drum 14 from leaving the face of linear drive member 12. Rollers can replace pins 34, 36, for reducing frictional resistance. The pair of pins 34, 36 can be substituted by a single pin or roller, which would be preferably centrally located between the positions of pins 34, 36. Cable drum 14 has spiraled grooves 38 in its outer circumferential face 40 to allow a cable 42 to be wound out or wound out from cable drum 14. Cable 42 is held taut and is coupled to pivot pins 22, 24 at opposite ends of linear drive member 12. Cable 42 is threaded through a hole 44 in cable drum 14 passing diagonally there through from opposing outer edges of outer circumferential face 40. Cable 42 is pre-tensioned above the maximum design load of cable drive device 10. As only a single cable 42 is provided with multiple wraps around cable drum 14, cable 42 is not subject to slip.

Cable drive device 10 can provide movement of a member by attaching either pivot pins 22, 24 to a member to be moved and anchoring support member 29 to a stationary support. Rotation of central axle 26 will result to longitudinal movement of linear drive member 12 through support member 29 by the roll on or roll off movement of cable 42 around cable drum 14. Cable drive device 10 can generally replace devices used for a rack and pinion type of movement.

Figure 43:
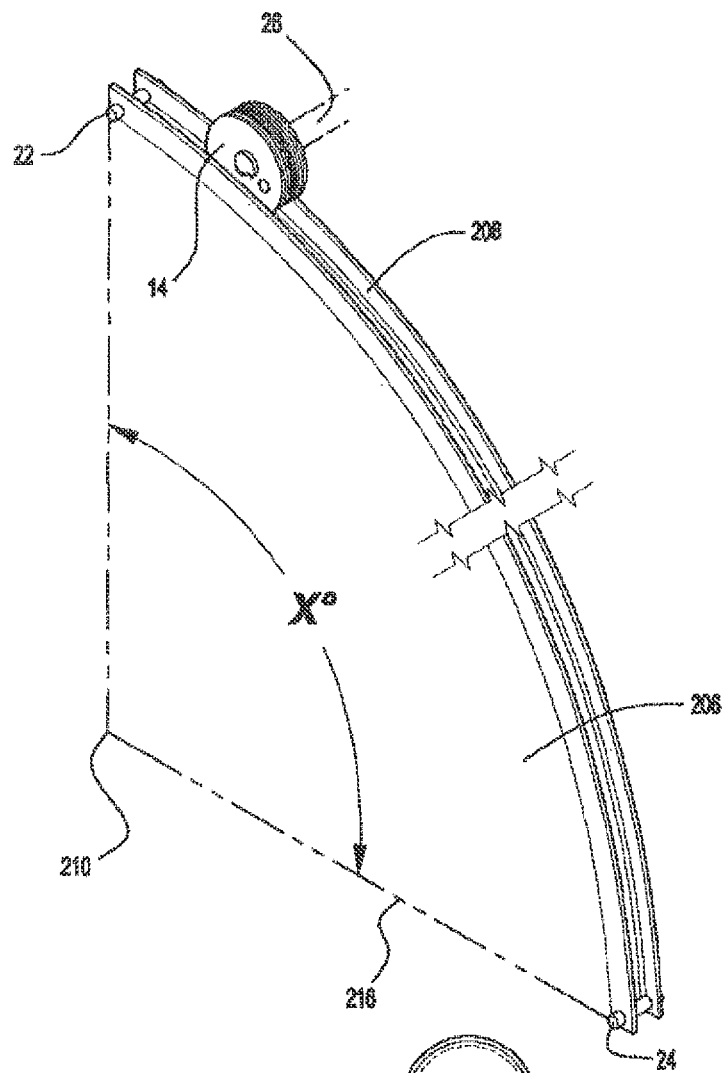
FIG. 43 is a perspective view of a circular drive device made in accordance with a preferred embodiment of the invention.
Figure 44:
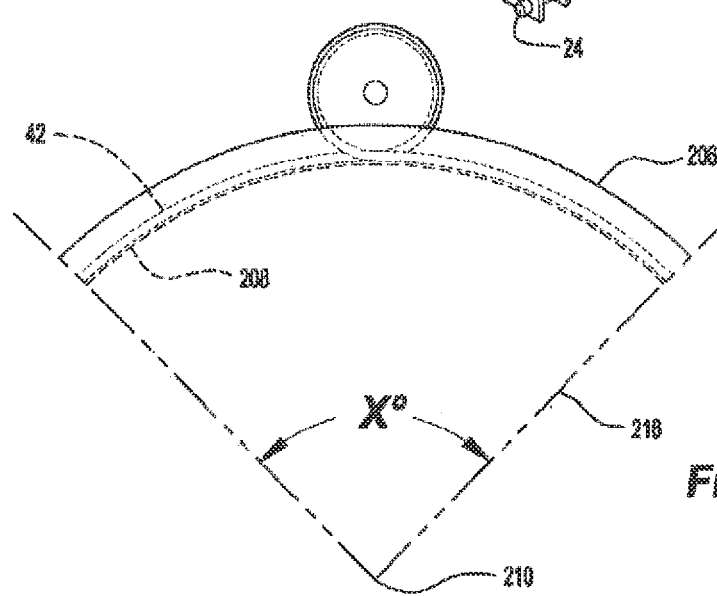
FIG. 44 is a front view of the circular drive device shown in FIG. 43 in a rotated position.

FIGS. 43 and 44 illustrate a similar cable drive device shown in FIGS. 1 to 5 where an arcuate or circular drive member 206 replaces linear drive member 12. Cable 42 is similarly attached to pivot pins 22, 24 and is held taut in groove 208 of arcuate or circular drive member 206. Cable drum 14 sits inside of groove 208 and can be supported by a bracket (not shown) and/or by axle 26. The arcuate or circular drive member 206 is shown as extending for angle X° where X can be any angle up to about 360°. The arcuate or circular drive member 206 will rotate about a central axis 210. Cable drum 14 will be configured in a similar manner to that described with reference to FIGS. 1 to 5. This embodiment will simulate a pinion gear (cable drum 14) driving a larger circular gear (arcuate or circular drive member 206). In use, the radial base 216 can be attached to a movable member, for example, the top of a flap valve and the flap valve can pivot about central axis 210. Axle 26 can be supported by a frame member and axle 26 can be rotated to allow radial base 216 to be move about central axis 210 as shown in FIG. 44. This movement will lift the flap valve to open the valve.

Figure 6:
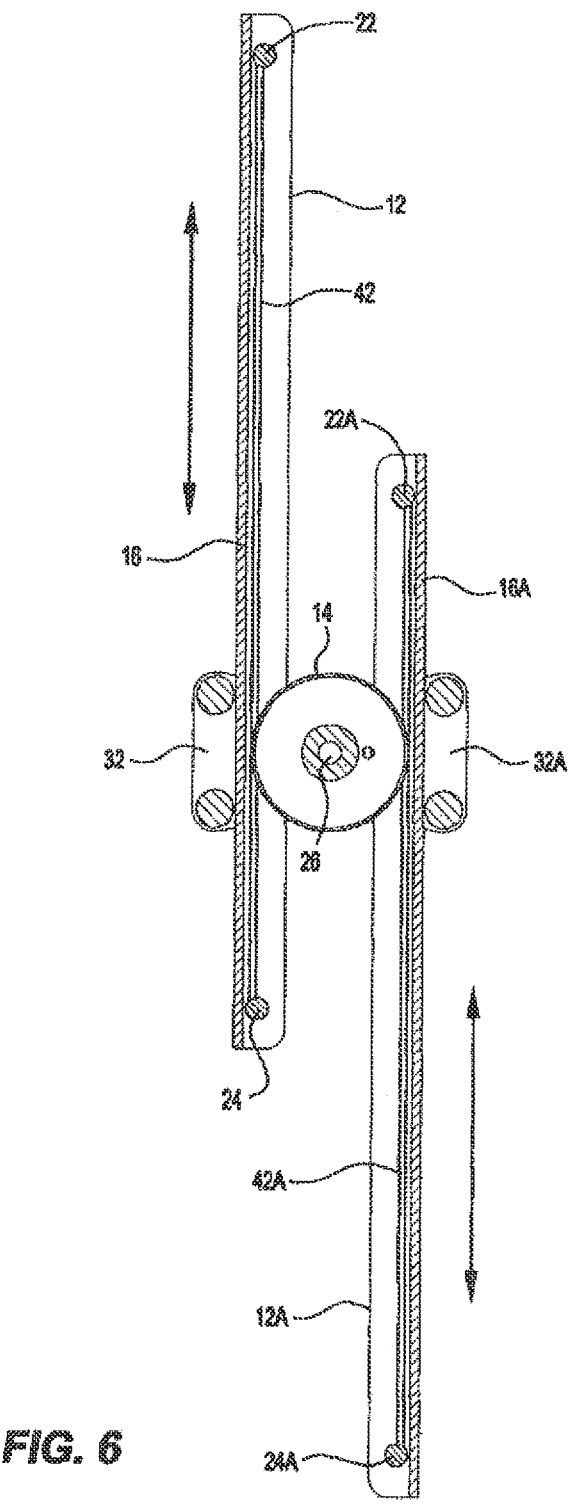
FIG. 6 is a similar view to that of FIG. 5 showing a second embodiment of a cable drive device made in accordance with the invention.

FIG. 6 illustrates an enhancement of the cable drive device 10 shown in FIGS. 1 to 5. In this embodiment a pair of linear drive members 12, 12A on opposite sides of cable drum 14 are provided. Separate spiraled grooves (not shown) are formed in the circumferential face of cable drum 14 to allow cables 42, 42A to co-operate with cable drum 14. The operation of linear drive member 12A is identical to that of linear drive member 12 discussed with reference to FIGS. 1 to 5. Because the linear drive members 12, 12A are on opposite sides of cable drum 14 and have opposing displacements, the movement of linear drive member 12 in one direction will cause movement of linear drive member 12A in the opposite direction on rotation of axle 26. This movement will allow greater linear movement between pivot pins 22, 24A.

Figure 7:
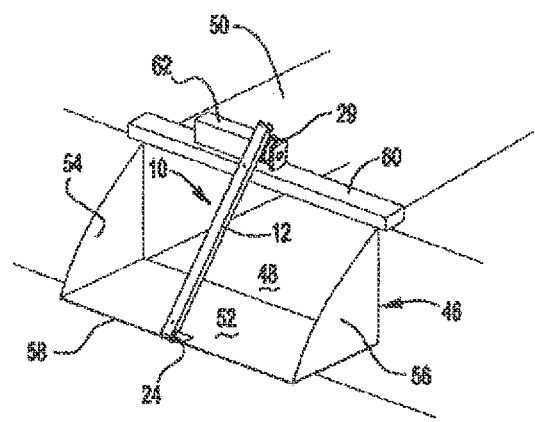
FIG. 7 is a perspective view of an irrigation channel showing the use of the cable drive device of FIG. 1 attached to an overshot control gate to control the flow of water in the irrigation channel.

FIG. 7 shows the use of the cable drive device 10 shown in FIGS. 1 to 5 in an irrigation system. A barrier member 46 is hinged at the bed or base 48 of a channel 50 through which water passes. Barrier member 46 includes a base member 52 and side members 54, 56. Barrier member 46 may be of a rigid construction, of the type shown in International Patent Application No. PCT/AU01/01036, or may be flexible, of the type known as Padman Bay outlets, or a combination thereof. The free end 58 of barrier member 46 is pivotally attached to pivot pin 24 of linear drive member 12 of cable drive device 10 of FIGS. 1 to 5. Support member 29 is secured to a frame member 60 across channel 50. An electric motor 62 is coupled to axle 26 to allow rotation of cable drum 14.

Figure 8:
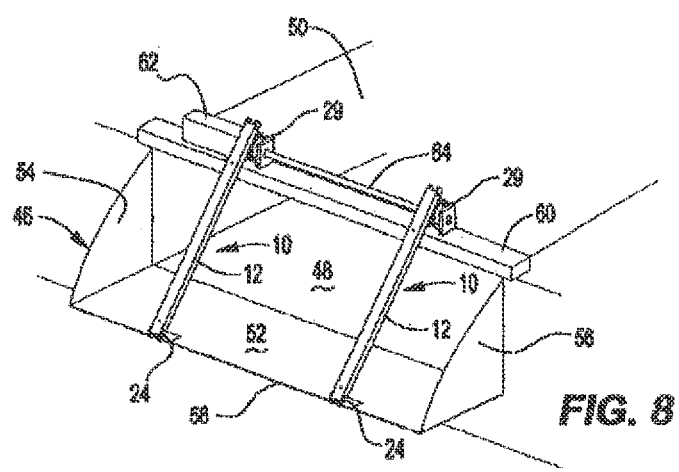
FIG. 8 is a similar view to that of FIG. 7 showing the use of a pair of cable drive devices of the type shown in FIG. 1.

FIG. 8 shows a variation of FIG. 7 where a pair of cable drive devices 10 are used. In this embodiment, electric motor 62 has an extended shaft 64 to allow rotation of the axles of both cable drive devices 10. If required, separate electric motors could be used. The embodiment is not limited to two cable drive devices 10 as any numbers may be used to suit the width of the channel 50. FIGS. 7 and 8 show use of a rigid construction of barrier member 46.

Figure 9:
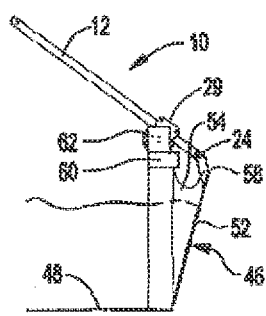
FIG. 9 is a side view of FIG. 7 showing the control gate closed.
Figure 10:
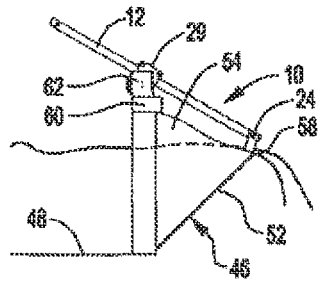
FIG. 10 is a similar view to that of FIG. 9 showing the control gate in a partially open position.
Figure 11:
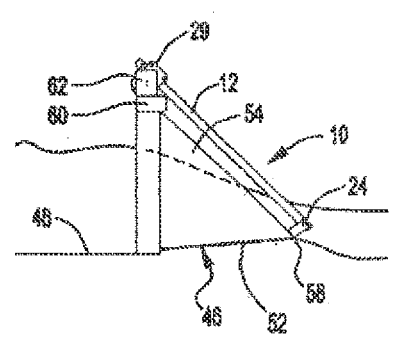
FIG. 11 is a similar view to that of FIG. 10 showing the control gate in a fully open position.
Figure 12:
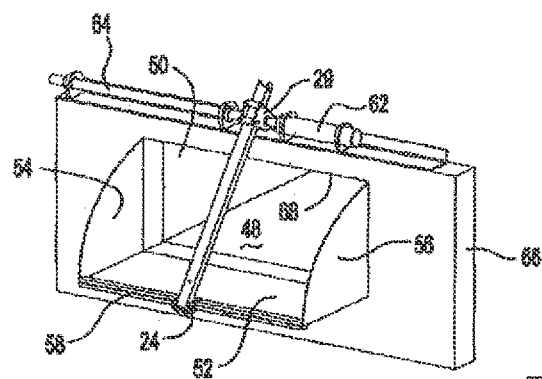
FIG. 12 is a perspective view of a further irrigation channel showing the use of the cable drive device of FIG. 1 attached to a control gate to control the flow of water in the irrigation channel.
Figure 13:
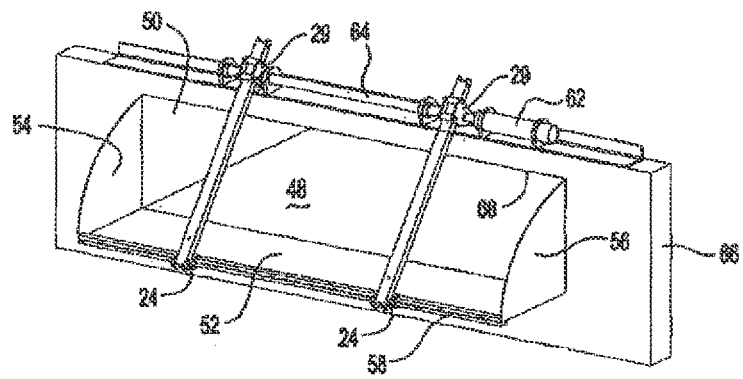
FIG. 13 is a similar view to that of FIG. 12 showing the use of a pair of cable drive devices of the type shown in FIG. 1.
Figures 14, 15, 16:
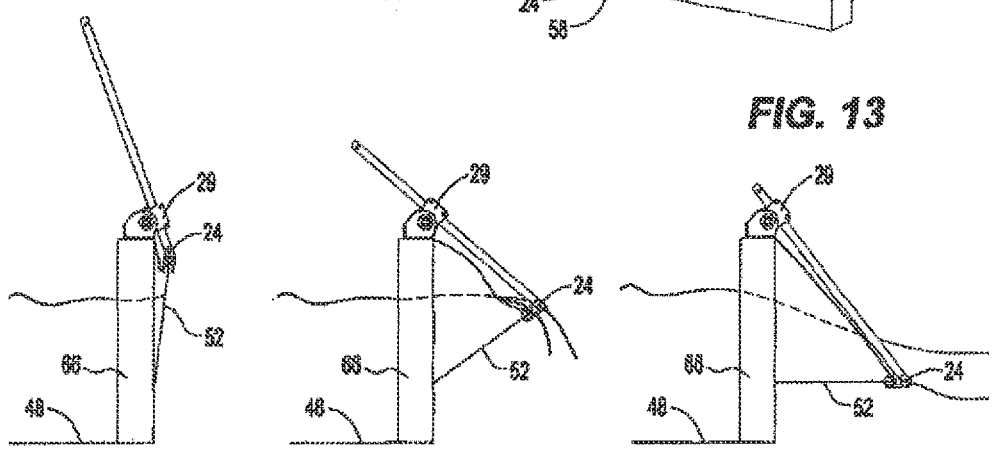
FIG. 14 is a side view of FIG. 12 showing the control gate closed.
FIG. 15 is a similar view to that of FIG. 14 showing the control gate in a partially open position.
FIG. 16 is a similar view to that of FIG. 15 showing the control gate in a fully open position.

FIGS. 9 to 11 show the operation of barrier member 46 using the cable drive device or devices 10. FIGS. 9 to 11 show barrier member 46 having a rigid base member 52 and flexible side members 54, 56. FIG. 9 has barrier member 46 in the closed position with linear drive member 12 fully extended in the upward direction. As barrier member 46 is lowered, water flows over the free end 58 of base member 52 in a controlled manner (FIG. 10). Full flow of water is obtained when linear drive member 12 is fully extended in the downward direction (FIG. 11). Linear drive member 12 will be partially immersed in the water, which can be a harsh environment for such devices. In prior art devices it is commonplace to use gear mechanisms, which do not suit being immersed or being exposed to water. Gears can jam and the gear teeth can wear resulting in drive backlash. The cable drive devices 10 do not suffer these disadvantages and allow a more accurate positioning of barrier member 46 to assist in superior measurement.

FIGS. 12 to 16 are very similar in construction and operation to the embodiment shown in FIGS. 7 to 11. In this embodiment a dam wall 66 extends across the channel and barrier member 46 is pivotally attached to the bottom of dam opening 68 rather than at the bed or base 48 of channel 50.

Although the cable drive device 10 of FIGS. 1 to 5 has been shown with reference to its use in the irrigation field in FIGS. 7 to 16 its use is not limited to that environment. Cable drive device 10 can be used where any mechanical movement is required.

FIGS. 17 to 22 illustrate an embodiment of a fluid control barrier 70, which is attached to the end 72 of a pipe 74. Pipe 74 is shown vertically disposed but could be readily disposed horizontally, or at any other desired angle. The fluid control barrier 70 can also be adapted to be located within pipe 74 and the embodiment described is not limited to the position or orientation shown in FIGS. 17 to 22. A flange 76 at the end of pipe 74 provides attachment to a flange 78 of fluid control barrier 70. A sealing lip 80 on flange 78 allows the sealing thereto of a pair of semi-circular plates 82, 84 forming a barrier member. The plates 82, 84 are joined along their diametric sides by hinge 86 to open and close fluid control barrier 70 and form a bi-foldable barrier member. Hinge 86 is fixed and constrained by frame elements 88, 90 of frame 92. A pair of cross-members 94, 96 complete frame 92. Plates 82, 84 fold in the direction of flow towards the centreline when opening and into the flow away from the centreline when closing.

In order to open and close plates 82, 84 a pair of struts 98, 100 downstream of pipe 74 are pivotally attached to plates 82, 84 at one end and are pivotally attached at the other end to a threaded journal 102 at the other end to form a thrust point. Journal 102 is coupled to a threaded member 104 supported by bearings 106, 108 in respective cross-members 94, 96. Rotation of the end 110 of threaded member 104 will result in opening and closing of fluid control barrier 70 as indicated by arrows 112.

Figure 17:
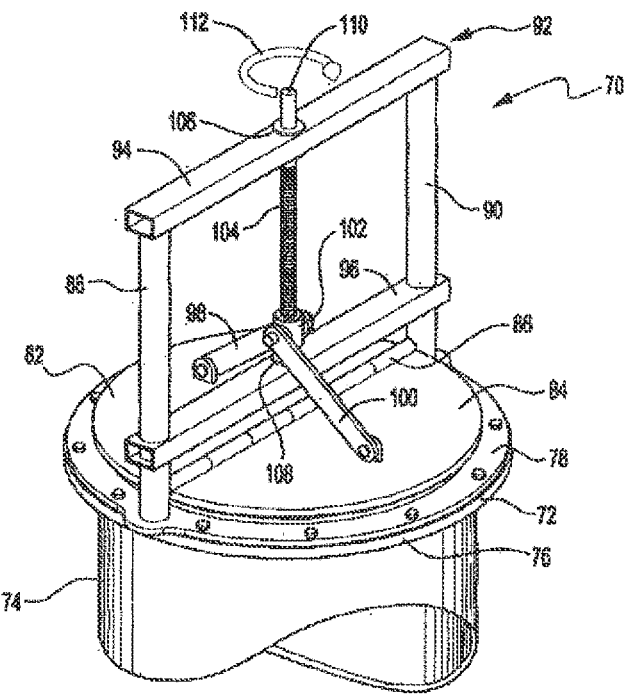
FIG. 17 is a perspective view of a fluid control barrier made in accordance with the invention and fitted to the end of a pipe with the fluid control barrier shown in the closed position.
Figure 18:
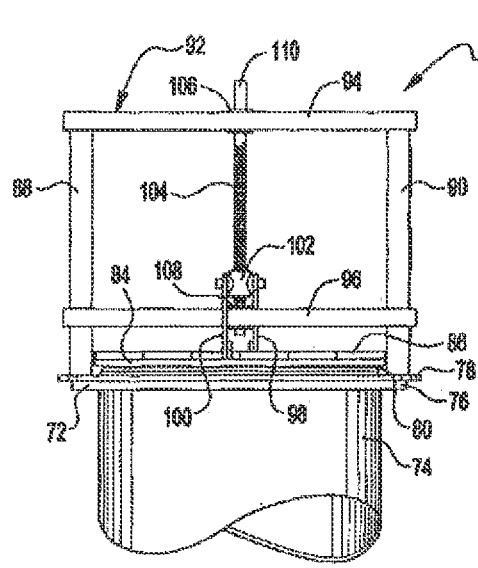
FIG. 18 is a front view of FIG. 17.
Figure 19:
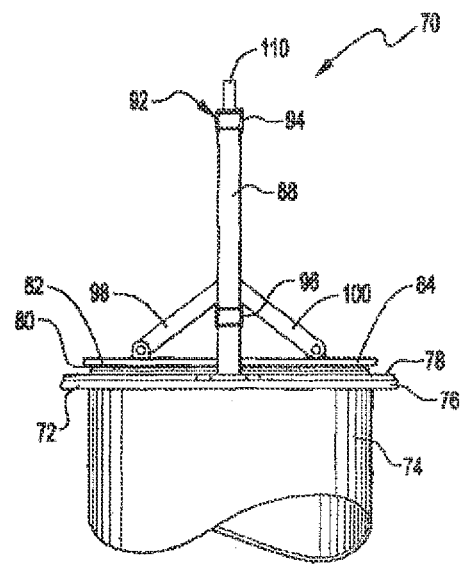
FIG. 19 is a side view of FIG. 17.
Figure 20:
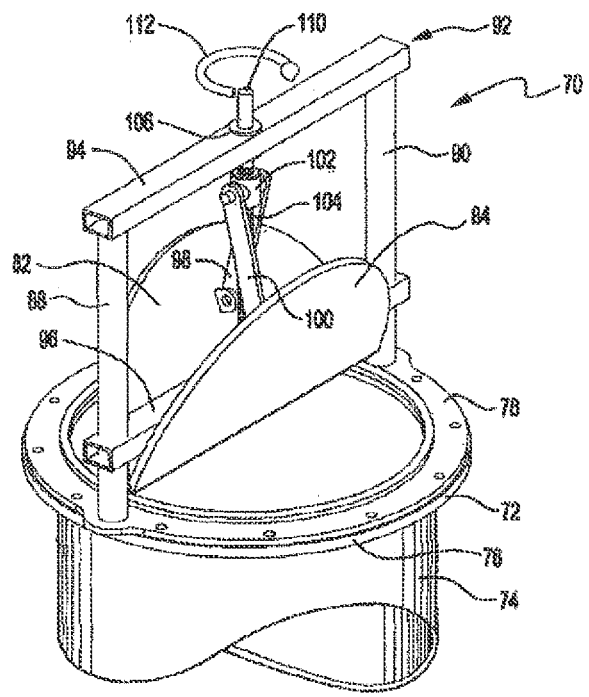
FIG. 20 is a similar view to that of FIG. 17 with the fluid control barrier shown in the open position.
Figure 21:
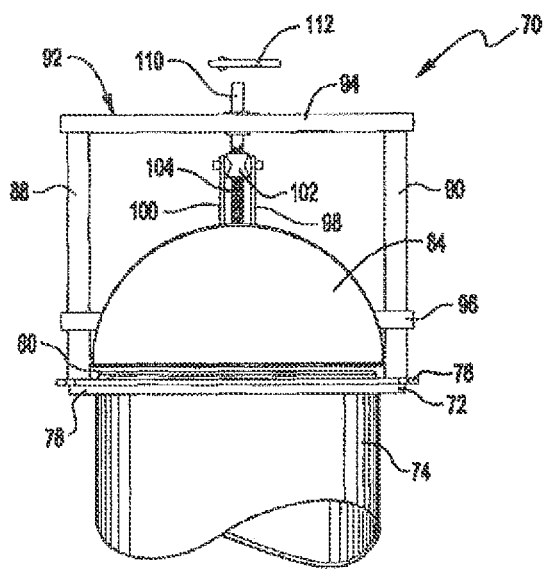
FIG. 21 is a front view of FIG. 20.
Figure 22:
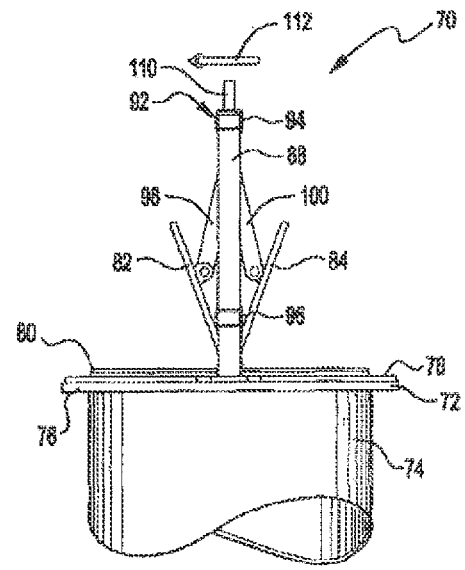
FIG. 22 is a side view of FIG. 20.
Figure 23:
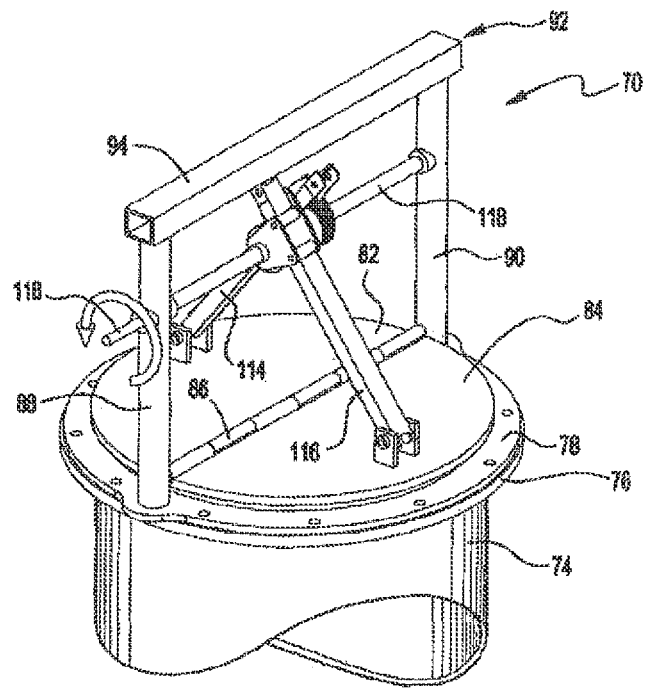
FIG. 23 is a perspective view of a fluid control barrier made in accordance with the invention and fitted to the end of a pipe with the fluid control barrier shown in the closed position using the cable drive devices as shown in FIG. 1.
Figure 24:
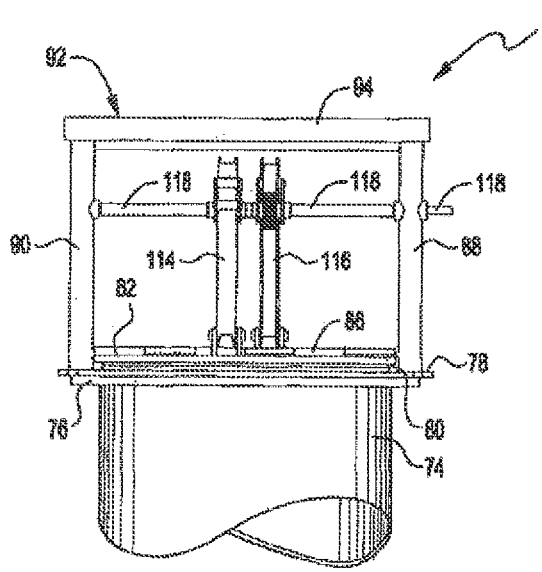
FIG. 24 is a front view of FIG. 23.
Figure 25:
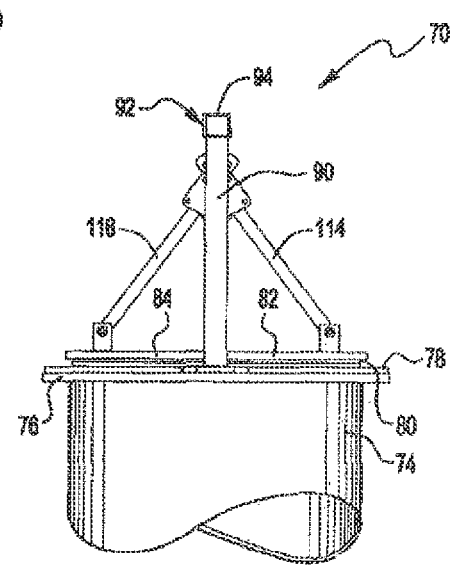
FIG. 25 is a side view of FIG. 23.
Figure 26:
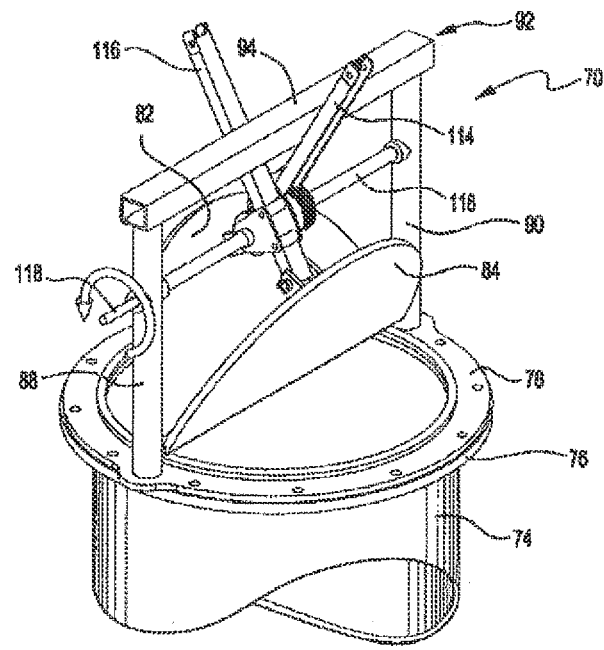
FIG. 26 is a similar view to that of FIG. 23 with the fluid control barrier shown in the open position.
Figures 27, 28:
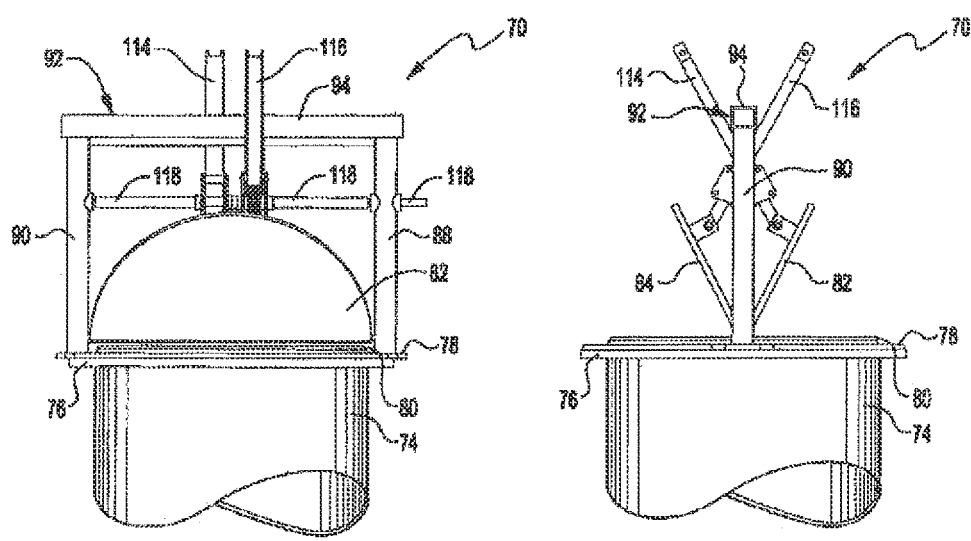
FIG. 27 is a front view of FIG. 26.
FIG. 28 is a side view of FIG. 26.

FIGS. 17 to 19 show plates 82, 84 pressed onto sealing lip 80 to prevent escape of water from pipe 74. Turning end 110 of threaded member 104 will cause threaded journal 102 to move up threaded member 104, as threaded journal 102 is constrained from rotating. The upward movement of threaded journal 102 will lift struts 98, 100, and plates 82, 84 will thus lift away from pipe 74 to open fluid control barrier 70, as shown in FIGS. 20 to 22. In this configuration the fluid control barrier 70 can be used for flood irrigation where water flows out pipe 74 and onto the ground. End 110 can be turned by hand or coupled to a rotation means e.g. motor or axle (not shown) controlled by irrigation automation (not shown). By turning end 110 in the opposite direction the plates 82, 84 will pivot towards sealing lip 80 to stop water flow.

It is evident that other forms of movement of the plates 82, 84 can be utilised and the invention is not limited to the embodiment shown in FIGS. 17 to 22. FIGS. 23 to 28, FIGS. 31 to 36 and FIGS. 37 to 42 disclose various embodiments to move plates 82, 84. FIGS. 23 to 28 have struts 98, 100 replaced by cable drive devices 114, 116, described with reference to FIGS. 1 to 5. Threaded member 104 has been replaced by a rotatable shaft 118 coupled to the axles of cable drive devices 114, 116 and supported by frame elements 88, 90. The operation is very similar to that shown in the embodiment of FIGS. 17 to 22 where rotation of shaft 118 will result in the opening or closing of plates 82, 84. The fluid control barrier 70 can also be adapted to be located within pipe 74 and the embodiment described is not limited to the position or orientation shown in FIGS. 23 to 28.

The embodiment shown in FIGS. 31 to 36 is very similar to the embodiment shown in FIGS. 17 to 22. In this embodiment a cable drive device 120, described with reference to FIGS. 1 to 5, replaces threaded member 104. Threaded journal 102 is not required as struts 98, 100 can be directly mounted to pivot pin 24 of cable drive device 120. The support member 29 of cable drive device 120 is mounted to cross-member 94. A drive shaft (not shown) is coupled to central axle 26 for rotation of cable drum 14 resulting in opening and closing of plates 82, 84. The fluid control barrier 70 can also be adapted to be located within pipe 74 and the embodiment described is not limited to the position or orientation shown in FIGS. 31 to 36.

The embodiment shown in FIGS. 37 to 42 has a completely different actuation mechanism when compared with the embodiments of FIGS. 17 to 28 and FIGS. 31 to 36. In this embodiment a threaded screw member 122 is supported in journals 124, 126 in frame elements 88, 90. Threaded screw member 122 has opposing threads 128, 130 separated by an unthreaded section 132. A pair of rotatable journals 134, 136 are mounted on respective plates 82, 84 and equispaced from hinge 86. A pair of threaded journals 138, 140 are threadably attached to respective threads 128, 130 on threaded screw member 122 and equispaced from unthreaded section 132. A first pair of equal length struts 142, 144 are pivotally mounted to rotatable journal 134 at one end and to threaded journal 136 at the other end. A second pair of equal length struts 146, 148 are pivotally mounted to rotatable journal 134 at one end and to threaded journal 136 at the other end. The points of attachment to each plate 82, 84 are along the radial axis that bisects the semicircle. The location of the position of rotatable journals 134, 136 can vary and may be determined on the basis of the specific force loading of the actuation mechanism and what is optimal for the actuation mechanism. From the closed position of plates 82, 84 shown in FIGS. 37 to 39, the shaft end 150 of threaded screw member 122 can be rotated. As the threaded journals 138, 140 are constrained from rotating, the threaded screw journals 138, 140 will move outwardly along respective threads 128, 130, as evident from FIGS. 40 to 42. Struts 142 to 148 will pivot and cause plates 82, 84 to be lifted and open the fluid control barrier. Turning the shaft end 150 in the opposite direction will reverse the movement and plates 82, 84 will be moved towards the closed position. The fluid control barrier 70 can also be adapted to be located within pipe 74 and the embodiment described is not limited to the position or orientation shown in FIGS. 37 to 42. The cable drive device depicted in FIG. 6 could replace the outward and inward movement of threaded journals 138, 140 along threaded screw member 122.

Figure 29:
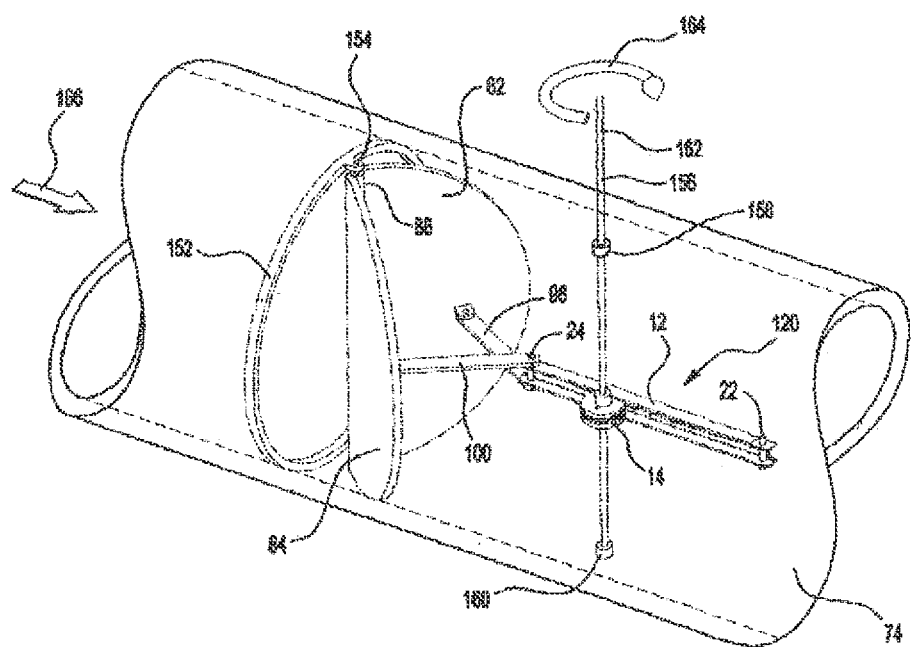
FIG. 29 is a perspective view of a fluid control barrier made in accordance with the invention and fitted inside a pipe with the fluid control barrier shown in the open position which uses a cable drive device as shown in FIG. 1.
Figure 30:
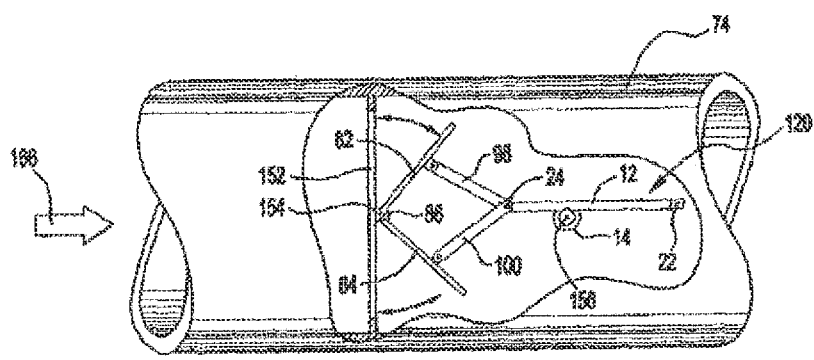
FIG. 30 is a side view of FIG. 29 with a cutaway to show the operation of the fluid control barrier.
Figure 31:
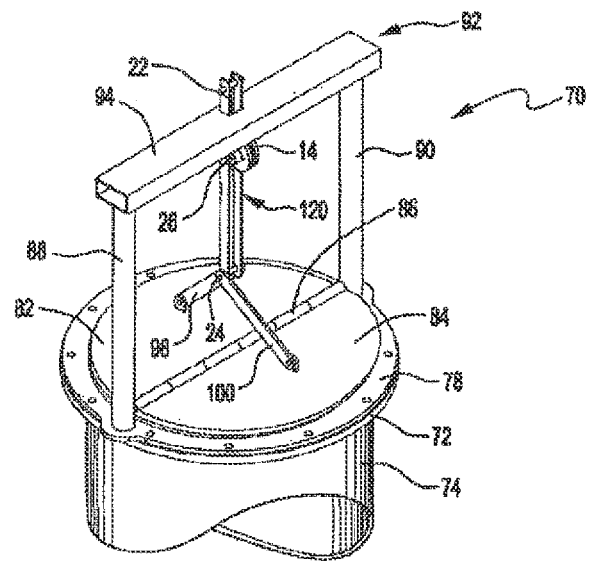
FIG. 31 is a perspective view of a fluid control barrier made in accordance with the invention and fitted to the end of a pipe with the fluid control barrier shown in the closed position.
Figure 32:
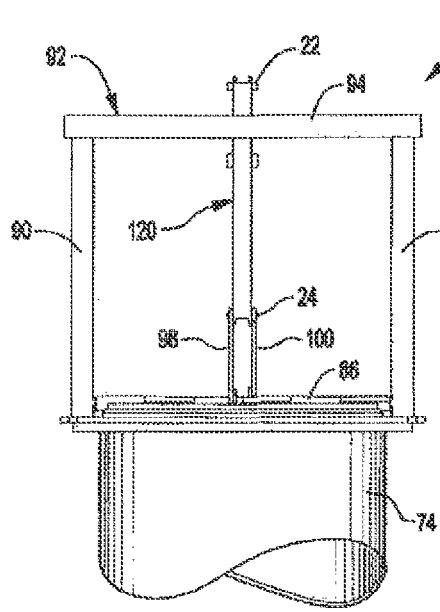
FIG. 32 is a front view of FIG. 31.
Figure 33:
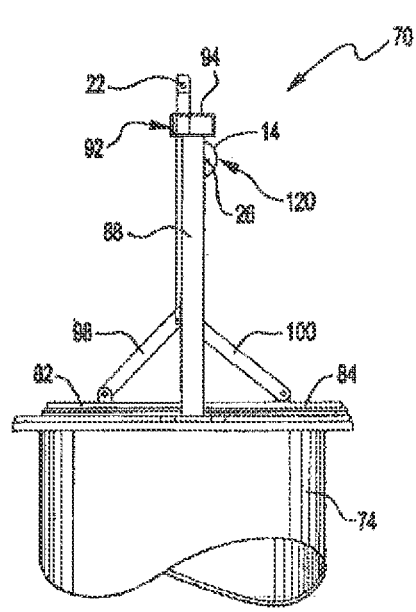
FIG. 33 is a side view of FIG. 31.
Figure 34:
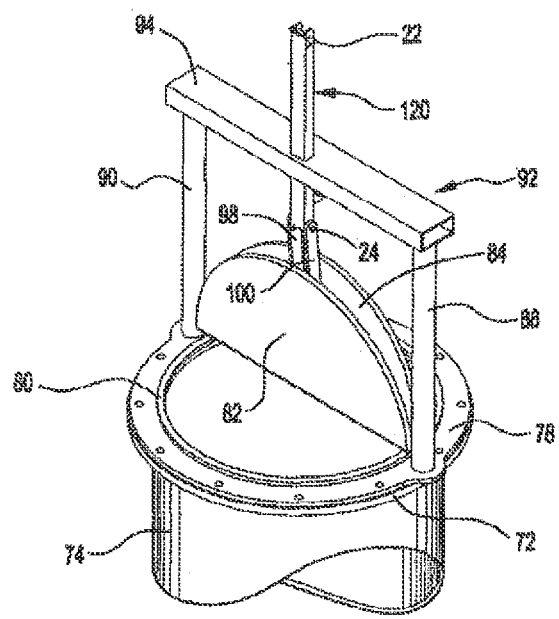
FIG. 34 is a similar view to that of FIG. 31 with the fluid control barrier shown in the open position.
Figure 35:
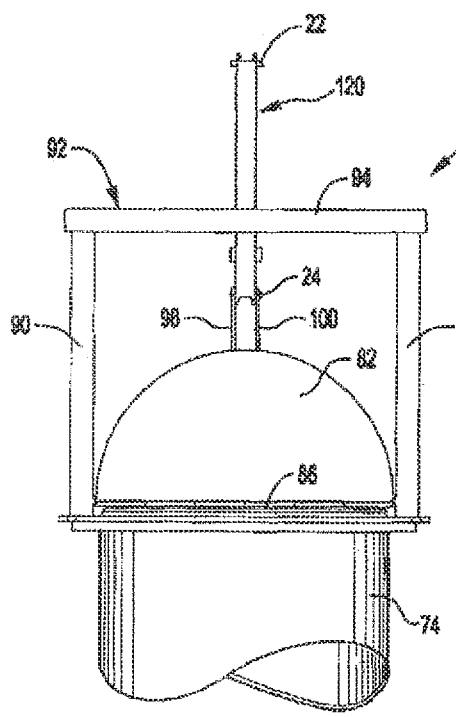
FIG. 35 is a front view of FIG. 34.
Figure 36:
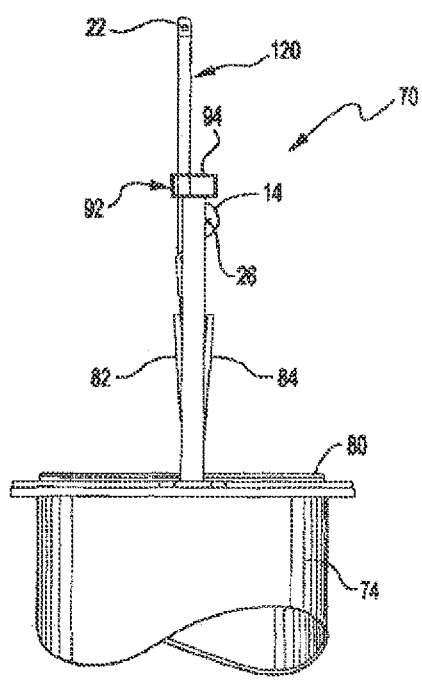
FIG. 36 is a side view of FIG. 34.
Figure 37:
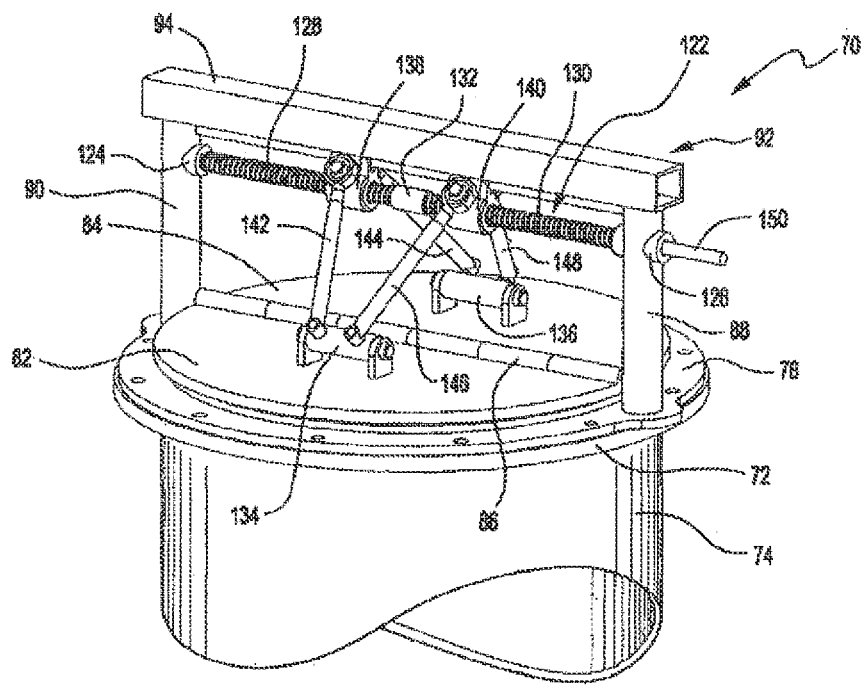
FIG. 37 is a perspective view of a fluid control barrier made in accordance with the invention and fitted to the end of a pipe with the fluid control barrier shown in the closed position.
Figures 38, 39:
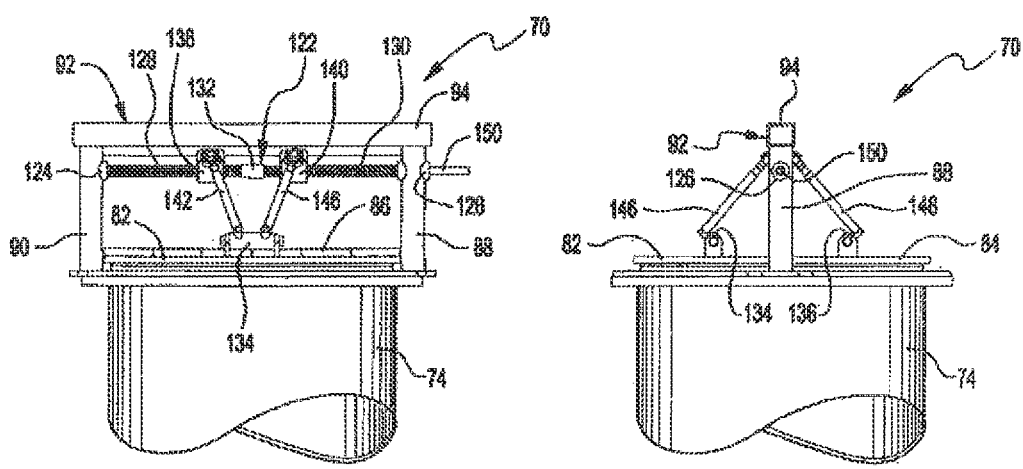
FIG. 38 is a front view of FIG. 37.
FIG. 39 is a side view of FIG. 37.

The embodiment shown in FIGS. 29 to 30 is very similar to the embodiment shown in FIGS. 31 to 36. The major difference is that instead of having plates 82, 84 mounted at the end of pipe 74, plates 82, 84 are mounted inside pipe 74. The other difference is that the cable drive 120 of the type described in FIGS. 1 to 5 is located inside pipe 74 rather than being externally mounted. An annular ring 152 on the inner circumference of pipe 74 replaces sealing lip 80. Annular ring 152 has a pair of protuberances 154 to receive the central pin of hinge 86 to fix the position of plates 82, 84. Plates 82, 84 are moved by the longitudinal movement of linear drive member 12 which is pivotally attached to struts 98, 100. Cable drum 14 has an axle 156 extending through pipe 74 and supported in bearings or journals 158, 160 in, or on, pipe 74. Rotation of the end 162 in the direction of arrow 164 will open the valve by lifting plates 82, 84 from its sealed position on annular ring 152 and allow flow of water through pipe 74 in the direction of arrow 166. It is evident that other actuation mechanisms can be utilised in relation to the mounting of plates 82, 84 inside pipe 74. For example, the embodiment shown in FIGS. 23 to 28 may be used.

The embodiment shown in FIGS. 45 to 48 differs from the embodiments shown in FIGS. 17 to 28 and FIGS. 29 to 42, in that fixed hinge 86 is replaced by a floating hinge 168. In this embodiment the hinge 168 is free to move in the direction of the pipe 74 centreline axis and remain perpendicular to the axis. The valve device can be used at pipe inlets and pipe outlets as well as internal to the pipe 74 as shown in this embodiment. A threaded screw member 170 is supported in journals 172, 174 in pipe 74. Threaded screw member 170 has opposing threads 176, 178 separated by an unthreaded section 180. A first pair of equal length struts 190, 192 are pivotally mounted to an unthreaded section 194 of threaded screw member 170 at one end and to respective plates 82, 84 at the other end. A second pair of equal length struts 196, 198 are pivotally mounted to an unthreaded section 200 of threaded screw member 170 at one end and to respective plates 82, 84 at the other end. The pivotal attachment of struts 190, 192, 196 and 198 to respective plates 82, 84 is along, or near to, the centroidal axis of the semi-circular plates 82, 84. It is also possible to have only one set of struts, which could be pivotally attached to the central unthreaded section 180.

In this embodiment the fluid pressure load associated with the semi-circular plates 82, 84 is transferred to the threaded screw member 170 through the struts 190, 192, 196 and 198. A key aspect of this embodiment is the location of pivotal load supporting struts 190, 192, 196 and 198 at or near the centroidal axis. Supporting the plates 82, 84 at the centroidal axis means the net fluid pressure forces are equal either side of the centroidal axis of each semi-circular plate 82, 84. The resultant effect is that the net force in opening or closing the plates 82, 84 is minimal and largely those associated with the frictional force in moving the hinge 168. This will substantially reduce the power requirements of a motor (not shown) to open and close the fluid control barrier. A small solar powered motor could be used.

The movement of hinge 168 in this embodiment uses a pair of threaded journals 182, 184 that are threadably attached to respective threads 176, 178 on threaded screw member 170 and equispaced from unthreaded section 180. A first strut 186 is pivotally mounted to hinge 168 at one end and to threaded journal 182 at the other end. A second strut 188 is pivotally mounted to hinge 168 at one end and to threaded journal 184 at the other end.

Figure 45:
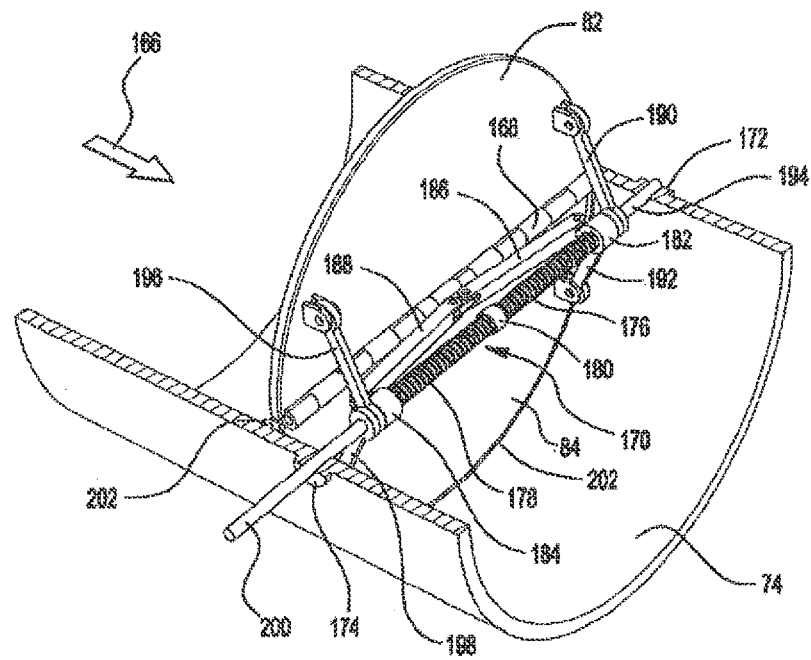
FIG. 45 is a perspective cutaway view of a fluid control barrier made in accordance with the invention and fitted inside a pipe with the fluid control barrier shown in the closed position.
Figure 46:
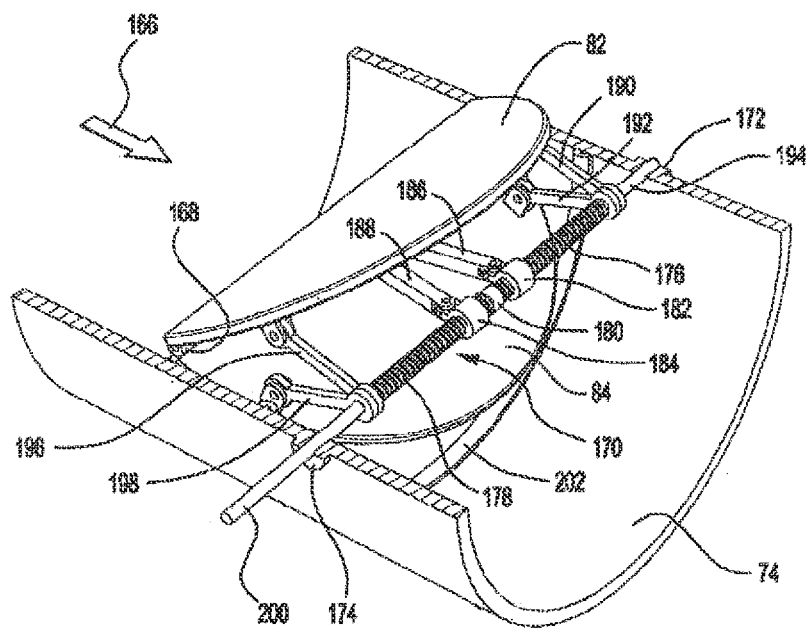
FIG. 46 is a similar view to that of FIG. 45 with the fluid control barrier shown in the open position.
Figure 47:
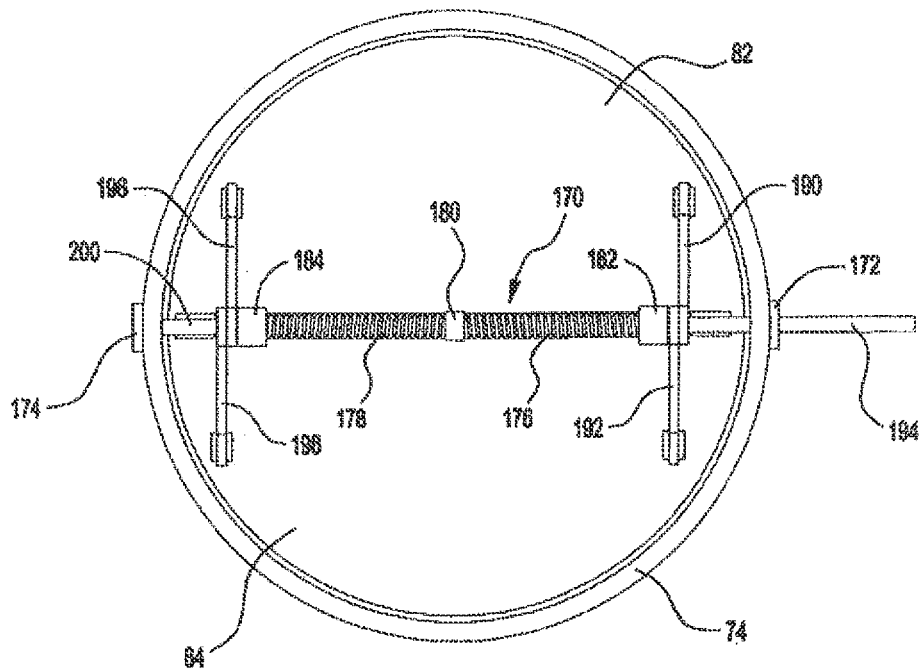
FIG. 47 is a plan view of a fluid control barrier shown in FIG. 45.
Figure 48:
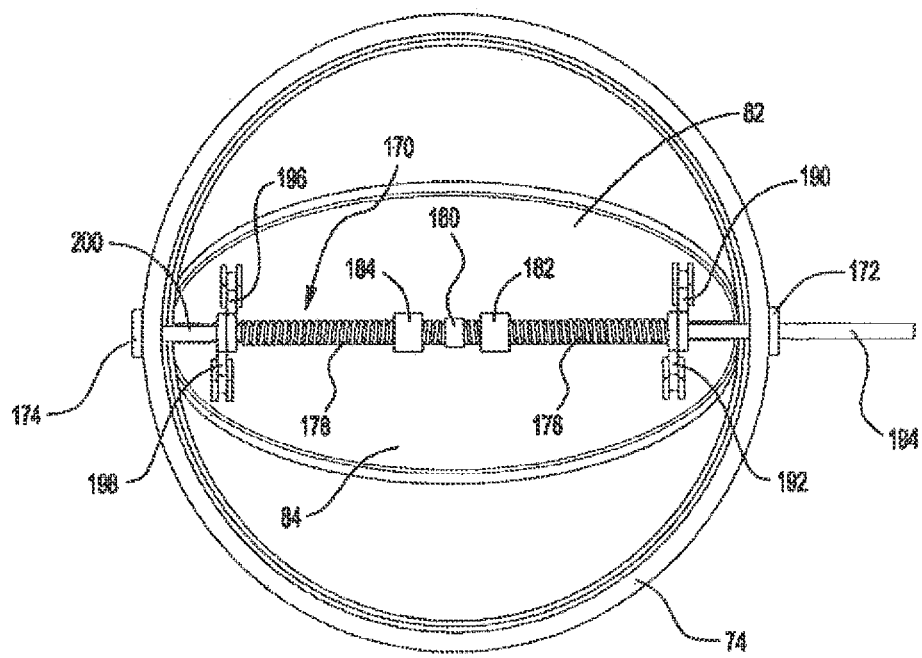
FIG. 48 is a plan view of a fluid control barrier shown in FIG. 46.

FIGS. 45 and 47 show the closed position whilst FIGS. 46 and 48 show the open position of the fluid control barrier. From the position shown in FIGS. 45 and 47 the threaded screw member 170 is rotated which results in threaded journals 182, 184 moving towards the centre of pipe 74 and pulling struts 186, 188 towards each other. This movement pushes hinge 168 away from threaded screw member 170 to release plates 82, 84 in a folding action from seal 202 to open the fluid control barrier. As previously discussed the net force in opening or closing the plates 82, 84 is minimal and largely those associated with the frictional force in moving the hinge 168 by struts 186, 188. Struts 190 and 192 and struts 196 and 198 will be drawn towards one another as shown in FIGS. 46 and 48.

In addition, the positioning of the struts 190, 192, 196 and 198 on plates 82, 84 with a slight location bias either side of the centroidal axis can result in a resultant force with a bias towards either self closing or self opening depending on what side of the axis is the location of the pivotal connection of the struts 190, 192, 196 and 198. A similar result can be obtained by offsetting the mounting point of the struts 190, 192, 196 and 198 above the surface of said plates 82, 84 and slightly away from the centroidal axis.

In a further embodiment threaded screw member 170 could be replaced by an unthreaded member and threaded journals 182, 184 replaced by annular drive rings which could be controlled by individual actuator members or by a cable drive device as shown in FIG. 6.

The definition of Centroid and Centroidal Axis: The Centroid is defined as the geometric centre or centre of mass of an object. For the purposes of this application the surface area either side of the centroidal line are equal and therefore the net pressure forces either side of the centroidal line of a semi-circular plate are equal.

The Centroidal axis is parallel to the straight edge of a semi-circular shaped plate and at a distance of y from the straight edge and where;

$y=4R/3\pi$ Where $R$ is the radius of the semicircle.

The embodiments shown in FIGS. 49 to 64 show different actuator devices to move floating hinge 168 as described in FIGS. 45 to 48.

Figure 49:
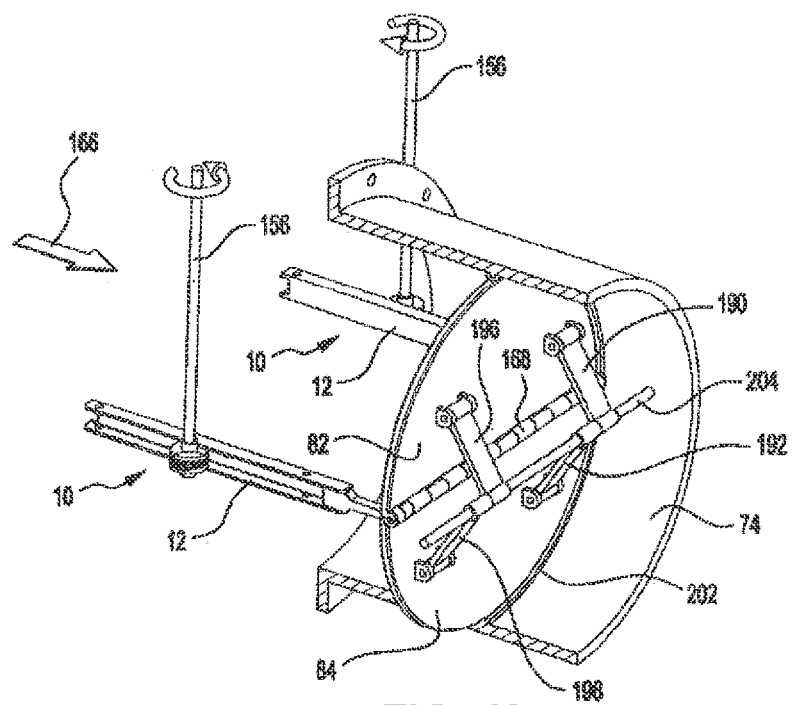
FIG. 49 is a perspective cutaway view of a fluid control barrier made in accordance with the invention and fitted inside a pipe with the fluid control barrier shown in the closed position.
Figure 50:
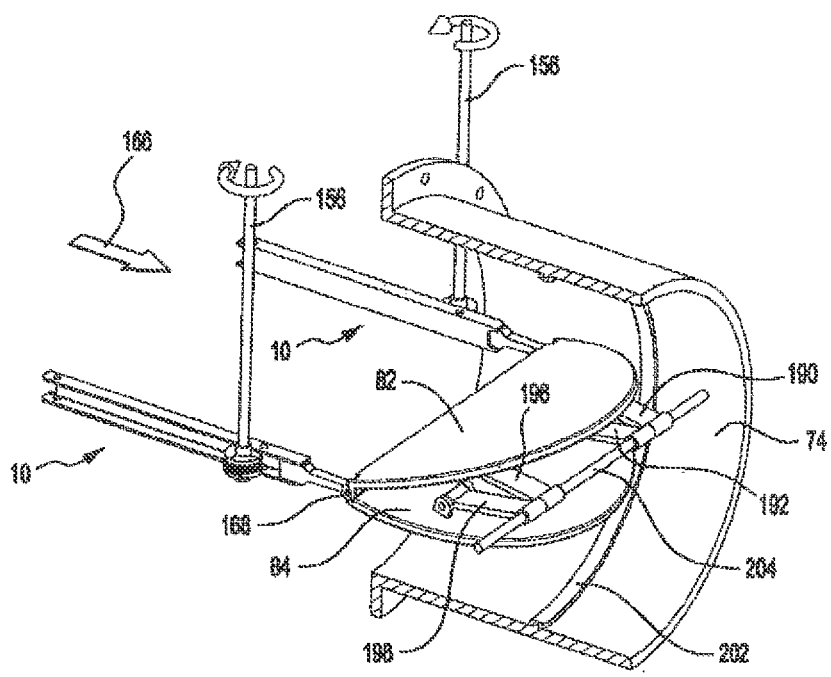
FIG. 50 is a similar view to that of FIG. 49 with the fluid control barrier shown in the open position.
Figure 51:
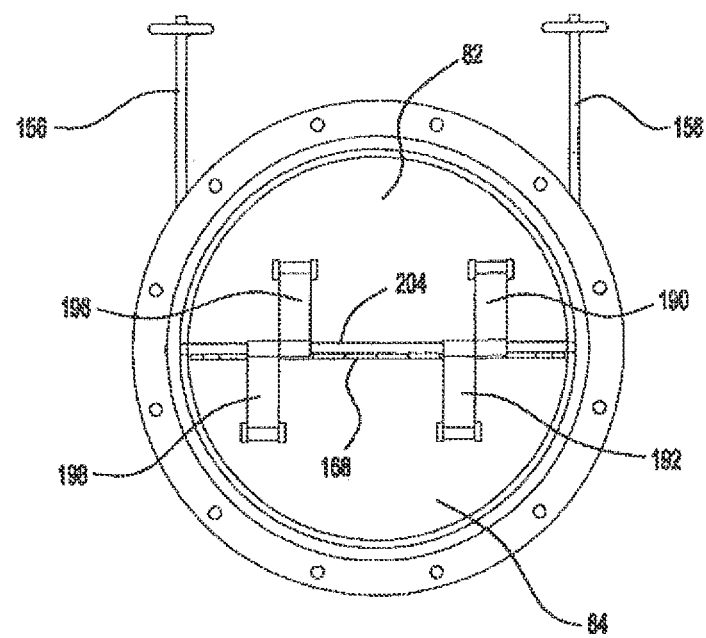
FIG. 51 is a plan view of a fluid control barrier shown in FIG. 49.
Figure 52:
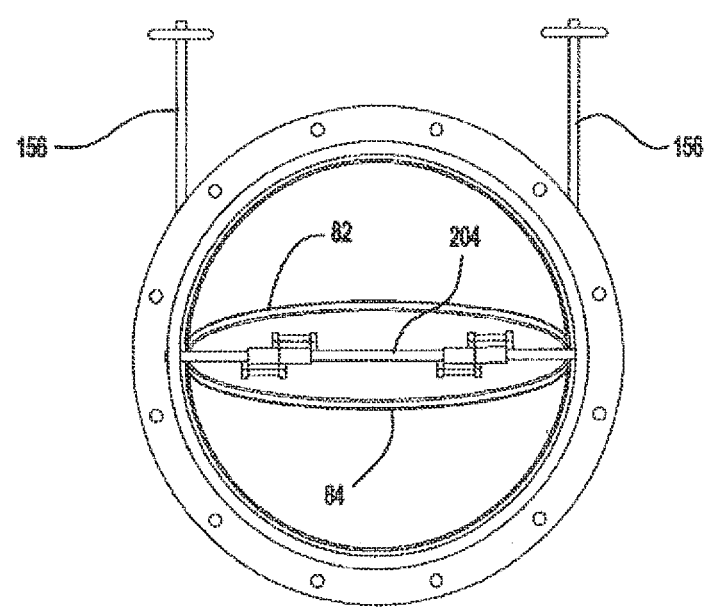
FIG. 52 is a plan view of a fluid control barrier shown in FIG. 50.
Figure 53:
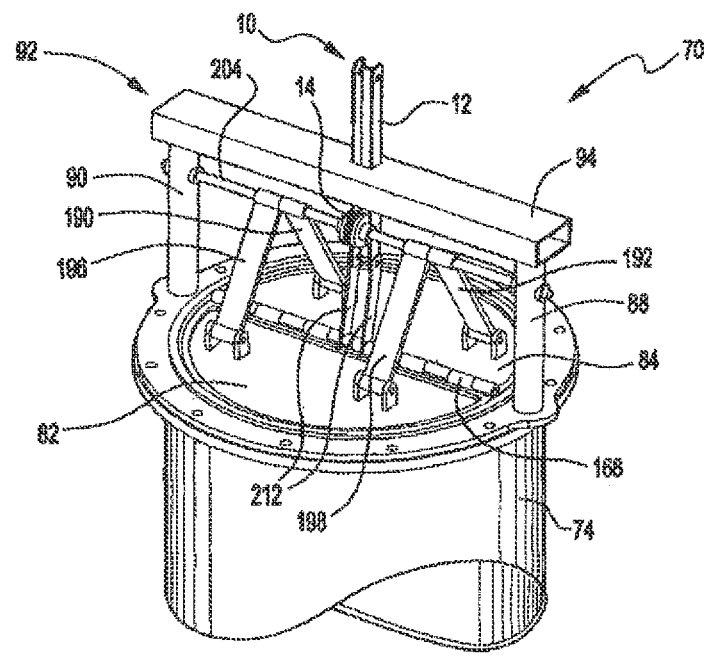
FIG. 53 is a perspective view of a fluid control barrier made in accordance with the invention and fitted to the end of a pipe with the fluid control barrier shown in the closed position.
Figure 54:
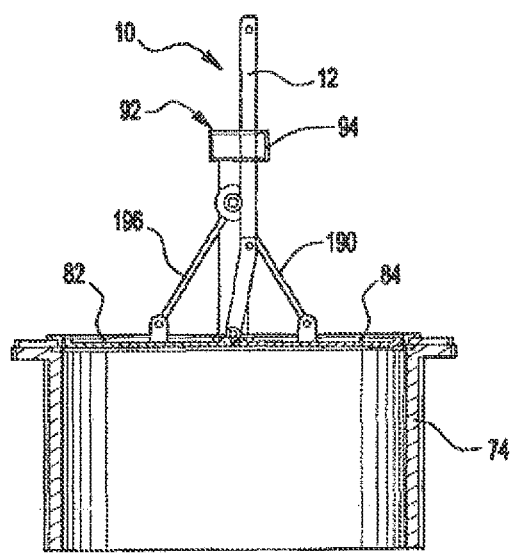
FIG. 54 is a cross-sectional view along and in the direction of the arrows shown in FIG. 55.
Figure 55:
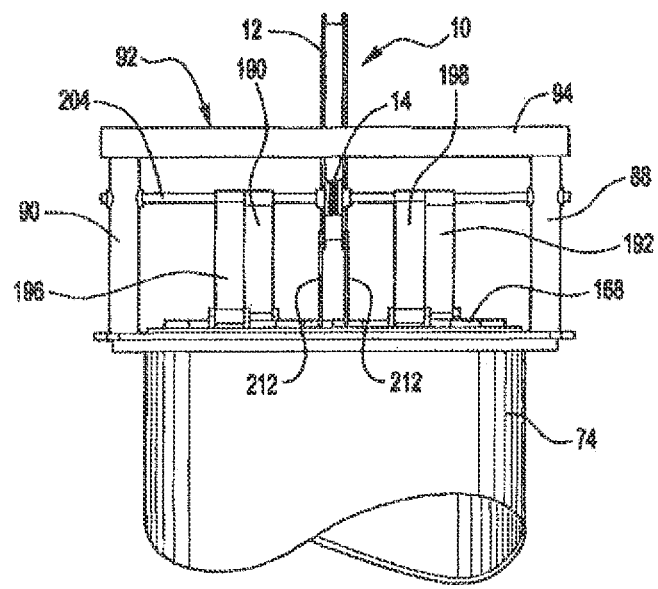
FIG. 55 is a front view of the fluid control barrier shown in FIG. 53.
Figure 56:
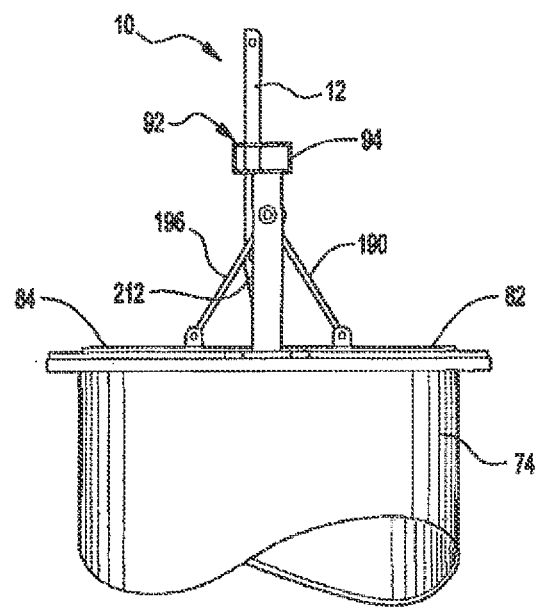
FIG. 56 is a side view of FIG. 55.
Figure 57:
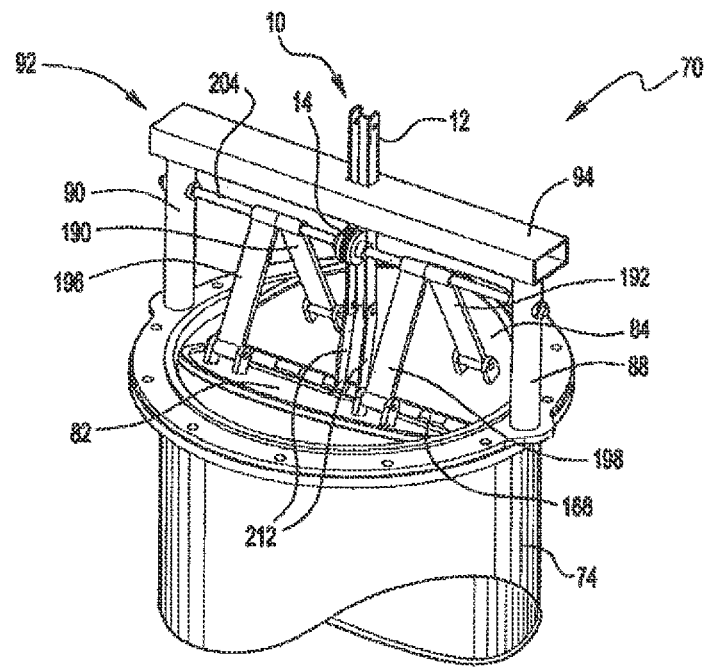
FIG. 57 is similar view to that of FIG. 53 showing the fluid control barrier starting to open.
Figure 58:
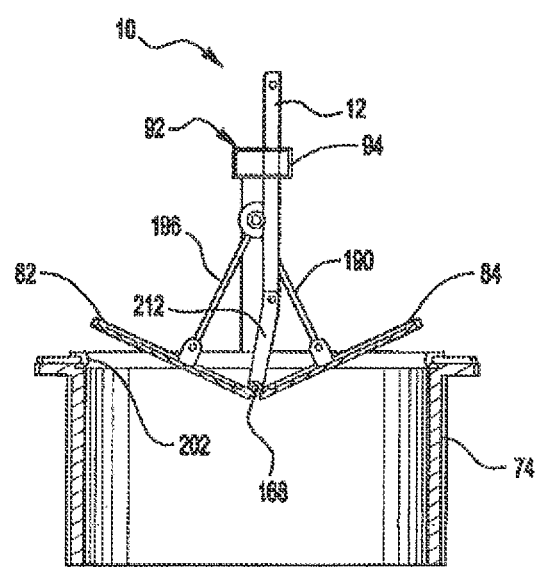
FIG. 58 is a cross-sectional view along and in the direction of the arrows shown in FIG. 59.
Figure 59:
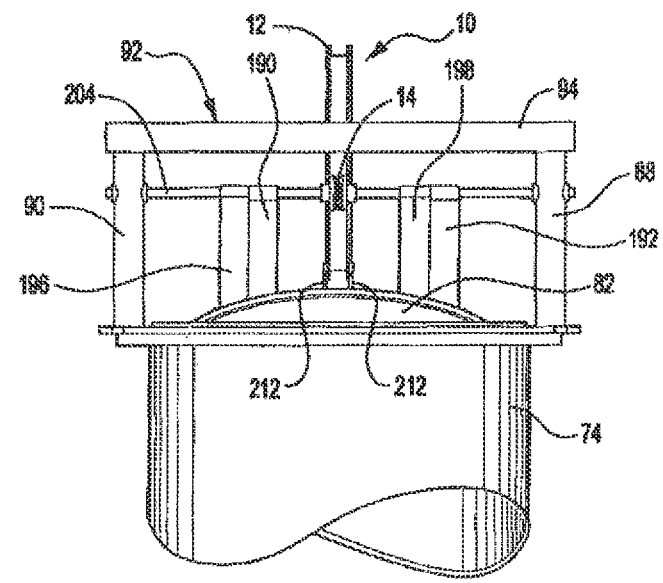
FIG. 59 is a front view of the fluid control barrier shown in FIG. 57.
Figure 60:
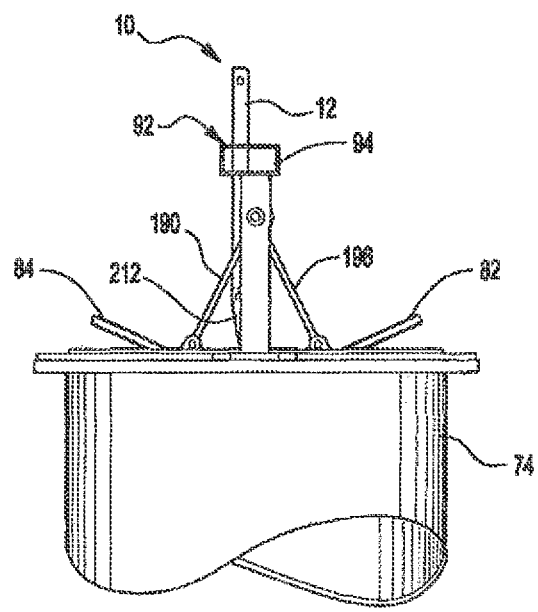
FIG. 60 is a side view of FIG. 59.
Figure 61:
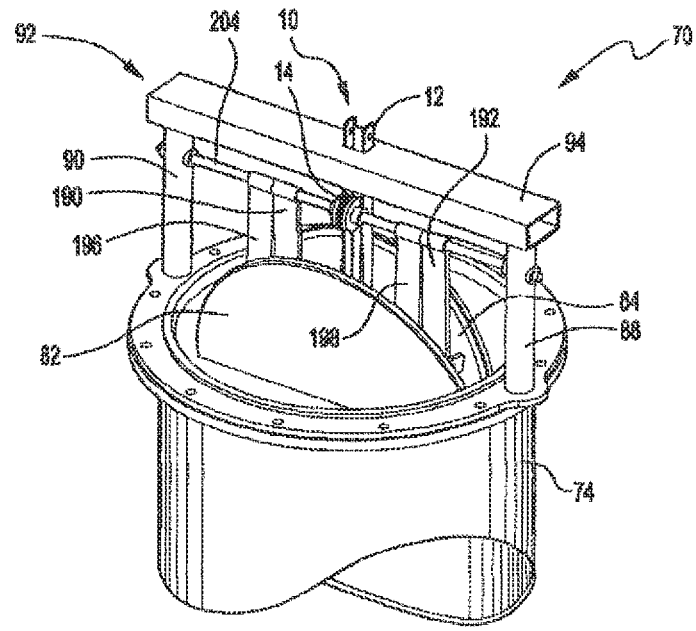
FIG. 61 is similar view to that of FIG. 53 showing the fluid control barrier completely open.
Figure 62:
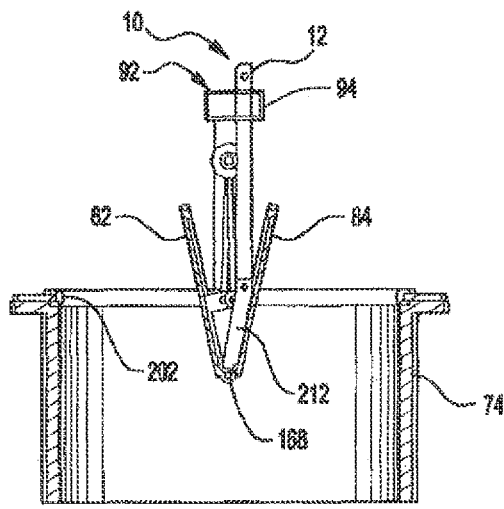
FIG. 62 is a cross-sectional view along and in the direction of the arrows shown in FIG. 63.
Figure 63:
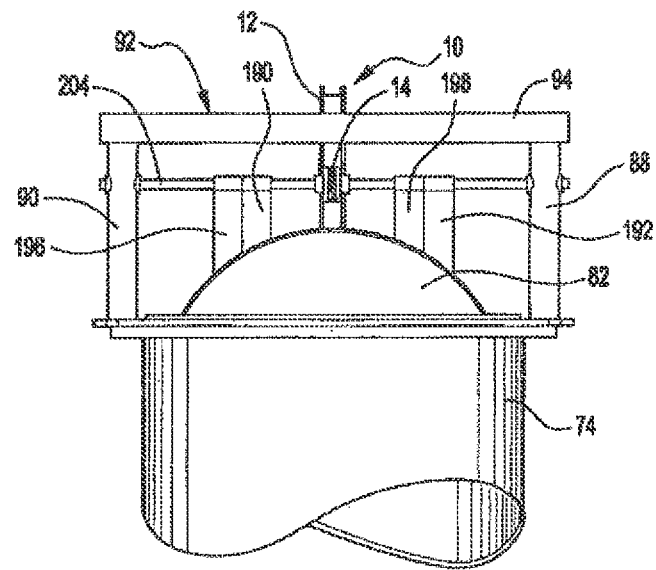
FIG. 63 is a front view of the fluid control barrier shown in FIG. 61.
Figure 64:
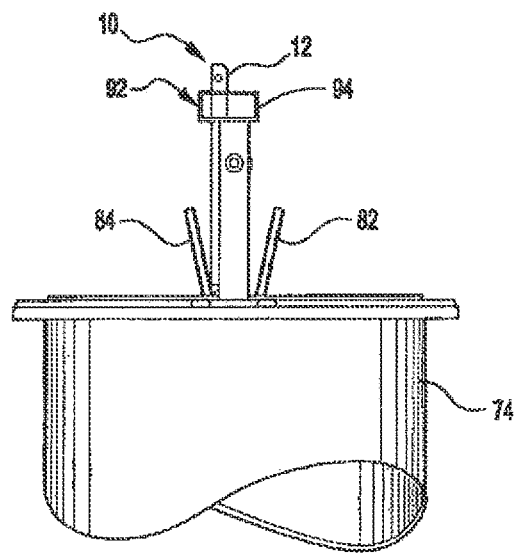
FIG. 64 is a side view of FIG. 61.
Figure 65:
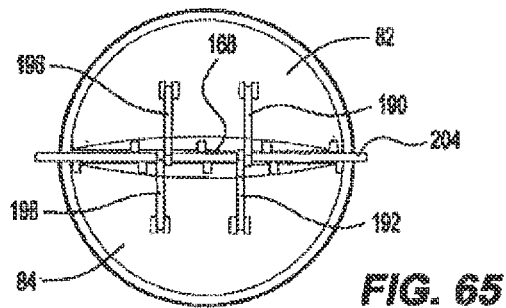
FIG. 65 is a plan view of a preferred bi-foldable barrier member shown in the closed position.
Figure 66:
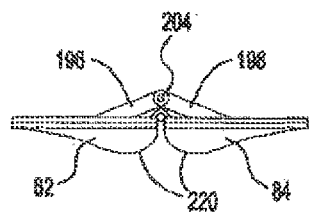
FIG. 66 is an end view of the barrier member shown in FIG. 65.
Figure 67:
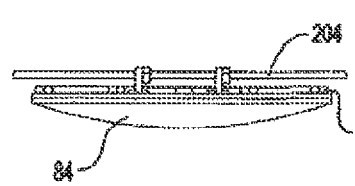
FIG. 67 is a side view of the barrier member shown in FIG. 65.
Figure 68:
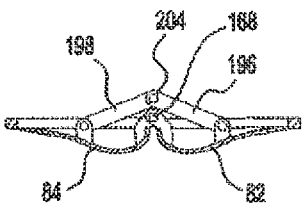
FIG. 68 is a cross-sectional view along and in the direction of the arrows shown in FIG. 67.
Figure 69:
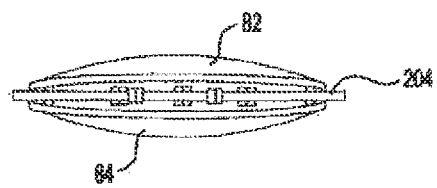
FIG. 69 is a perspective view of the barrier member shown in FIG. 65.
Figure 70:
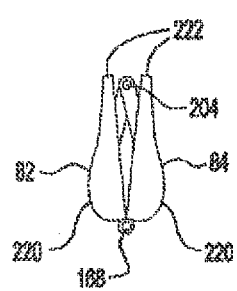
FIG. 70 is a plan view of the barrier member shown in FIG. 65 in the half-closed position.
Figure 71:
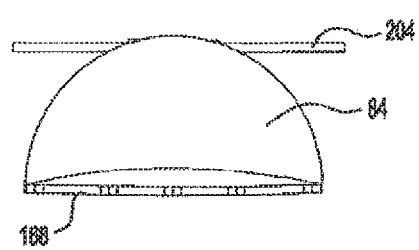
FIG. 71 is an end view of the barrier member shown in FIG. 70.
Figure 72:
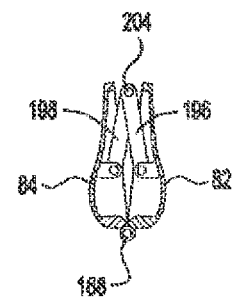
FIG. 72 is a side view of the barrier member shown in FIG. 70.
Figure 73:
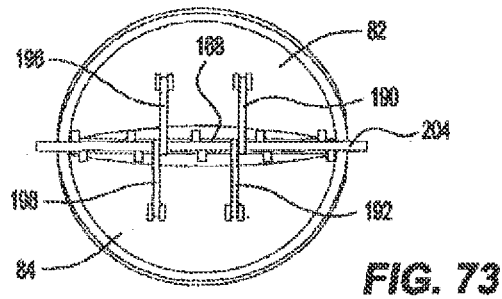
FIG. 73 is a cross-sectional view along and in the direction of the arrows shown in FIG. 72.
Figure 74:
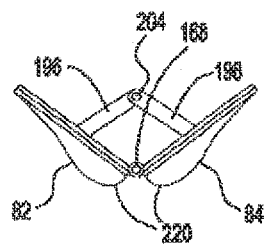
FIG. 74 is a perspective view of the barrier member shown in FIG. 70.
Figure 75:
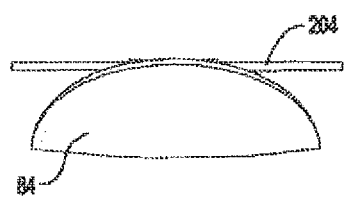
FIG. 75 is a plan view of the barrier member shown in FIG. 65 in the fully open position.
Figure 76:
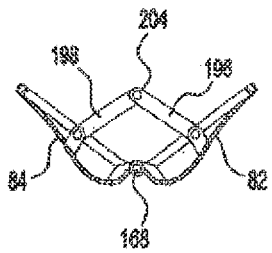
FIG. 76 is an end view of the barrier member shown in FIG. 75.
Figure 77:
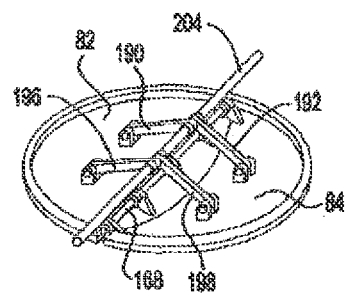
FIG. 77 is a side view of the barrier member shown in FIG. 75.
Figure 78:
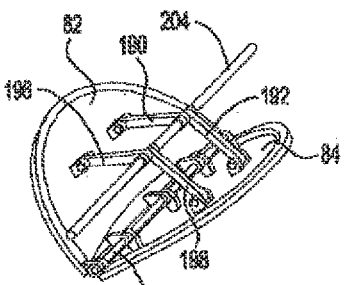
FIG. 78 is a cross-sectional view along and in the direction of the arrows shown in FIG. 77.
Figure 79:
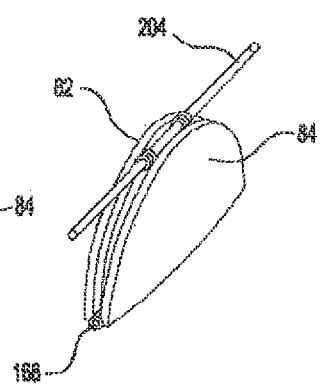
FIG. 79 is a perspective view of the barrier member shown in FIG. 75.

FIGS. 49 to 52 show a similar fluid control barrier to that shown in FIGS. 45 to 48. In this embodiment movement of hinge 168 is by a pair of cable drive devices 10 as described with reference with FIGS. 1 to 5. A non-threaded shaft 204 passes through pipe 74 to replace the threaded screw member 170. Struts 186, 188 are not required to move against hinge 168. Cable drive devices 10, from the closed position, pull hinge 168. The embodiment shows a pair of cable drive devices 10 at opposing ends of hinge 168 but a single centrally located cable drive device 10 could also be used. The pivotal attachment of struts 190, 192, 196 and 198 to respective plates 82, 84 is along, or near to, the centroidal axis of the semi-circular plates 82, 84 as described with reference to FIGS. 45 to 48. FIGS. 49 and 51 show the closed position of the fluid barrier whilst FIGS. 50 and 48 show the open position of the fluid control barrier. From the position shown in FIGS. 49 and 51 the axles 156 are rotated causing the linear drive members 12 to pull hinge 168 axially away and pull struts 186, 188 towards each other. This movement pulls hinge 168 to release plates 82, 84 in a folding action from seal 202 to open the fluid control barrier. Struts 190 and 192 and struts 196 and 198 will be pulled towards one another as shown in FIGS. 50 and 52. Again the net force in opening or closing the plates 82, 84 by cable drive devices 10 is minimal.

FIGS. 53 to 64 show an embodiment that is very similar to the embodiment shown in FIGS. 49 to 52 except that the fluid control barrier is located at the end of pipe 74 rather than being located inside pipe 74. The pair of cable drive devices 10 shown in FIGS. 49 to 52 has been reduced to a single device 10, which is external to pipe 74. The non-threaded shaft 204 is constrained by journals in frame elements 88, 90 of frame 92 and is drivingly coupled to cable drum 14. A pair of hinge struts 212 are pivotally coupled at one end to linear drive member 12 and to the other end to hinge 168. The pivotal attachment of struts 190, 192, 196 and 198 to respective plates 82, 84 is along, or near to, the centroidal axis of the semi-circular plates 82, 84 as described with reference to FIGS. 45 to 48. In the closed position shown in FIGS. 53 to 56 the plates 82, 84 will be pressed against seal 202 to prevent escape of water. The rotation of shaft 204 will result in rotation of cable drum 14 which will move linear drive member 12 downwardly. This downward force will push hinge 168 downwardly to the position shown in FIGS. 57 to 60 to open the fluid control barrier. Plates 82, 84 will pivot away from seal 202 in view of their pivotal connection to hinge 168. Struts 190 and 192 and struts 196 and 198 will be pulled towards one another to push plates 82, 84 into pipe 74. FIGS. 61 to 64 show the fluid control barrier completely open with plates 82, 84 having an acute angle between them and collapsing around struts 190, 192, 196 and 198. As discussed previously the supporting of plates 82, 84 at the centroidal axis means the net fluid pressure forces are equal either side of the centroidal axis of each semi-circular plate 82, 84. The resultant effect is that the net force in opening or closing the plates 82, 84 is minimal and largely those associated with the frictional force in moving the hinge 168.

Additional and/or alternate mechanisms to those described could be used to actuate the plates 82, 84 by providing force on hinge 168. The man skilled in the art could readily select such mechanisms and the invention is not limited to the mechanisms shown for the fluid control barrier.

The fluid control barriers described hereinbefore using a pair of semi-circular plates barriers 82, 84 pivoting at hinge 86 or 168 and positioned across the diameter of pipe 74 will bisect the flow moving through pipe 74. The advantage of this type of fluid control barrier is that there is a symmetrical flow profile generated perpendicular to the hinge 86 or 168. A symmetrical flow profile will suit the location of a flow meter using ultrasonic transit time flow measurement techniques discussed in Wikipedia and in International Patent Application No. PCT/AU2010/001052, the contents of which are incorporated herein. The invention allows a flow meter to be located immediately upstream of fluid control barrier and is unique as it is often necessary to locate flow meters some distance upstream of a fluid control barrier or valve (typically up to five pipe diameters in order that a symmetrical velocity profile is developed. Traditional valve mechanisms such as a butterfly valve or a gate valve do not generate a symmetrical velocity profile immediately upstream of the valve.

A further embodiment to the bi-folding plates 82, 84 is to streamline the shape of the barrier surface (upstream) to lessen the drag and therefore the energy loss of the fluid as it traverses the valve. When the valve is fully open and the two barriers are adjacent and near in line with the pipe centreline, the cross-sectional profile would approximate a streamlined 'tear drop' shape. The embodiment shown in FIGS. 65 to 79 illustrates the tear drop shape formed by the bi-folding plates 82, 84. Plates 82, 84 provide a clam shell type configuration each having a bulge 220 at the hinged end and tapering towards the shaft end 222. When plates 82, 84 are in the fully open position as shown in FIGS. 75 to 79 a basic tear drop profile will be formed by the exterior surfaces of plates 82, 84. Plates 82, 84 wilt form a clam shell which will substantially enclose struts 190, 192, 196 and 198 to reduce frictional drag of the water.

In the embodiments shown with pipe 74 and semi-circular plates 82, 84 the invention is not limited to a complementary circular construction. Pipe 74 could be square or any other closed profile with plates 82, 84 being configured to match the pipe profile. In non-circular profiles the hinges 86, 168 can be located midpoint to provide symmetrical or non-symmetrical plates 82, 84.

The centroidal axes can be readily determined to maintain the reduced force to move hinge 168.

The invention will be understood to embrace many further modifications as will be readily apparent to persons skilled in the art and which will be deemed to reside within the broad scope and ambit of the invention, there having been set forth herein only the broad nature of the invention and certain specific embodiments by way of example.

The invention claimed is:

1. A cable drive device, for moving a movable member, including:
   a linear drive member having opposite ends;
   a single cable drum;
   a support bracket comprising:
      first and second opposing face plates, which guide the linear drive member through the support bracket between the first and second face plates and adjacent the cable drum; and
      at least one element extending from the first face plate to the second face plate such that the linear drive member is positioned between the single cable drum and the at least one element to retain the linear drive member adjacent the single cable drum; and
   a cable;
   at least one of the ends being attachable to the movable member;
   the single cable drum being attached to the support bracket;
   the single cable drum having an axle with a portion extending between and supported by the first and second face plates to allow rotation of the single cable drum;
   the cable being affixed at each of the ends and tautly wrapped around the single cable drum;
   the single cable drum being located between the ends to move the linear drive member longitudinally through the support bracket when the axle is rotated.

2. The cable drive device of claim 1 wherein the cable is a single cable.

3. The cable drive device of claim 1 wherein the single cable drum includes a hole through which the single cable passes.

4. The cable drive device of claim 1 wherein the at least one of the ends has a pivot pin for the attachment.

5. The cable drive device of claim 1 wherein each of the ends has a respective pivot pin.

6. The cable drive device of claim 1 including a motor for driving the axle.

7. The cable drive device of claim 1 wherein the axle is supported by the support bracket.

8. The cable drive device of claim 1, wherein the at least one element comprises at least one of a pin or a roller.

9. An apparatus comprising:
   a fluid control barrier member; and
   a cable drive device, for moving the fluid control barrier, the cable drive device comprising:
      a linear drive member having opposite ends;
      a single cable drum;
      a support bracket comprising:
         first and second opposing face plates, which guide the linear drive member through the support bracket, between the first and second face plates and adjacent the cable drum; and
         at least one element extending from the first face plate to the second face plate such that the linear drive member is positioned between the single cable drum and the at least one element to retain the linear drive member adjacent the single cable drum; and
      a cable;
      at least one of the ends being attached or attachable to the fluid control barrier;
      the single cable drum being attached to the support bracket;

the single cable drum having an axle with a portion extending between and supported by the first and second face plates to allow rotation of the single cable drum;

the cable being affixed at each of the ends and tautly wrapped around the single cable drum;

the single cable drum being located between the ends to move the linear drive member longitudinally through the support bracket when the axle is rotated.

10. The apparatus of claim 9, which further comprises: a motor connected to drive the axle.

11. The apparatus of claim 9, wherein the at least one element comprises at least one of a pin or a roller.

12. A cable drive device comprising:
a linear drive member having opposite ends;
a support bracket adapted to be affixed to a surface and having first and second opposing face plates which guide the linear drive member through the support bracket between the first and second face plates and adjacent the cable drum; and
a single cable drum attached to the support bracket, said single cable drum having an axle with a portion extending between and supported by the first and second face plates to allow rotation of said single cable drum, said single cable drum having a cable affixed at at least one of the ends of said linear drive member and tautly wrapped around said single cable drum, said single cable drum being located between said ends of said linear drive member to allow said linear drive member to be guided longitudinally through said support bracket to move said linear drive member longitudinally when said axle is rotated, wherein the support bracket comprises at least one element extending from the first face plate to the second face plate such that the linear drive member is positioned between the single cable drum and the at least one element to retain the linear drive member adjacent the single cable drum.

13. The cable drive device of claim 12, wherein said single cable drum is provided with a hole through which said cable passes.

14. The cable drive device of claim 12, wherein the at least one element comprises at least one of a pin or a roller.

* * * * *